United States Patent [19]

Fujimori et al.

[11] Patent Number: 5,450,379
[45] Date of Patent: Sep. 12, 1995

[54] INFORMATION STORAGE MEDIUM, METHOD OF FABRICATING SAME, AND DRIVE UNIT FOR SUCH MEDIUM

[75] Inventors: Minoru Fujimori; Yasuhide Fujiwara; Satoshi Nebashi; Masuo Tsuji; Hiroaki Nomura; Noriyuki Kamijo; Tatsuya Shimoda, all of Suwa, Japan

[73] Assignee: Seiko Epson Corporation, Tokyo, Japan

[21] Appl. No.: 74,866

[22] PCT Filed: Oct. 9, 1992

[86] PCT No.: PCT/JP92/01312

§ 371 Date: Aug. 12, 1993

§ 102(e) Date: Aug. 12, 1993

[87] PCT Pub. No.: WO93/07617

PCT Pub. Date: Apr. 15, 1993

[30] Foreign Application Priority Data

Oct. 9, 1991 [JP] Japan ................. 3-262030
Oct. 9, 1991 [JP] Japan ................. 3-262031
Oct. 9, 1991 [JP] Japan ................. 3-262032

[51] Int. Cl.6 ............... G11B 13/04; G11B 23/30
[52] U.S. Cl. ................... 369/275.1; 369/14; 369/275.2; 369/274; 360/135
[58] Field of Search ........ 369/275.2, 13, 44.14, 369/103, 104, 287, 288, 14, 116, 59, 274; 360/48, 32, 51, 114, 135

[56] References Cited

U.S. PATENT DOCUMENTS

| 4,769,802 | 9/1988 | Tatsuguchi | 369/32 |
|---|---|---|---|
| 4,779,145 | 10/1988 | Lemelson | 369/14 |
| 4,841,515 | 6/1989 | James | 369/275.2 |
| 5,067,039 | 11/1991 | Godwin et al. | 369/14 |
| 5,107,481 | 4/1992 | Miki et al. | 369/32 |
| 5,132,947 | 7/1992 | Kameda et al. | 369/32 |
| 5,218,599 | 6/1993 | Tsuyoshi et al. | 369/275.1 |
| 5,291,462 | 3/1994 | Richards | 369/13 |

FOREIGN PATENT DOCUMENTS 0093228 11/1983 European Pat. Off. .
52-98403 7/1977 Japan .
55-165481 11/1980 Japan .
57-6446 1/1982 Japan .
57-61685 4/1982 Japan .
58-2736 1/1983 Japan .
58-35137 3/1983 Japan .
59-36347 2/1984 Japan .
59-135581 2/1984 Japan .
59-118135 8/1984 Japan .
59-227076 12/1984 Japan .

(List continued on next page.)

OTHER PUBLICATIONS

Research Disclosure, No. 303, New York, US, Jul. 1989, p. 482 "Optical/Magnetic Disk" XP 000045785.

IBM Technical Disclosure Bulletin, Jul. 1882, New York US, vol. 25, No. 2, pp. 459–460 "Optical/Magnetic Storage Disk System".

IBM Technical Disclosure Bulletin, vol. 23, No. 2, Jul. 1980, New York US, pp. 554–555 "Hybrid Storage Disks".

Primary Examiner—Georgia Y. Epps
Assistant Examiner—Kim-Kwok Chu
Attorney, Agent, or Firm—Harold T. Tsiang

[57] ABSTRACT

An information storage medium having both a read-only optical storage portion and a magnetic storage portion that can be written and read is provided. There is also disclosed a drive unit for use with this information storage medium. To control the optical head of this drive unit, a system controller and a CLV servomechanism are provided and form a control portion. When information is written or read to or from the magnetic storage portion, this control portion commands a disk-rotating mechanism to control the magnetic head of the drive unit based on information read from the optical storage portion of the medium. The magnetic storage portion can have either a single track or plural tracks. Interference between the optical head and the magnetic head can be avoided. The drive unit can adapt itself to the information storage medium having the optical storage portion of a large storage capacity and the magnetic storage portion that can be easily rewritten.

26 Claims, 26 Drawing Sheets

FOREIGN PATENT DOCUMENTS

| | | |
|---|---|---|
| 60-55526 | 3/1985 | Japan . |
| 60-124041 | 7/1985 | Japan . |
| 61-153134 | 9/1986 | Japan . |
| 62-55226 | 4/1987 | Japan . |
| 62-229587 | 10/1987 | Japan . |
| 63-259858 | 10/1988 | Japan . |
| 1-159227 | 11/1989 | Japan . |
| 3152781 | 6/1991 | Japan . |
| 4-26978 | 1/1992 | Japan . |
| 4-26978 | 1/1992 | Japan . |
| 2196467 | 4/1988 | United Kingdom . |

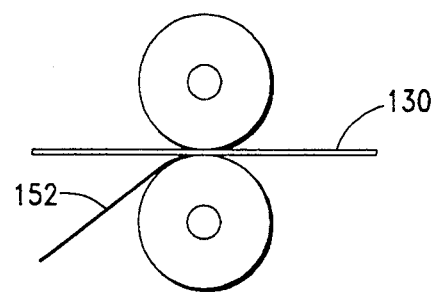
FIG.—3A
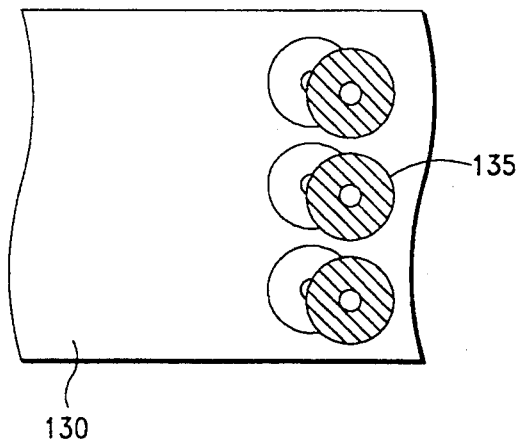
FIG.—3B
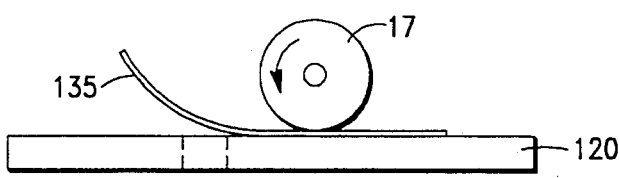
FIG.—3C
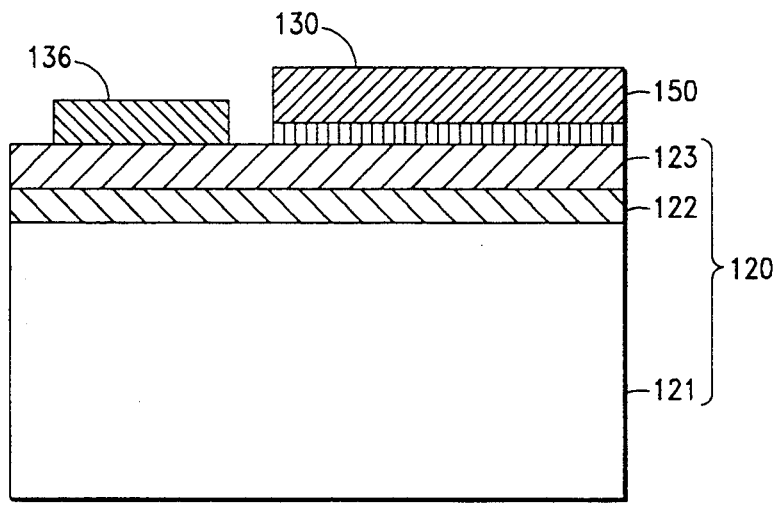
FIG.—3D

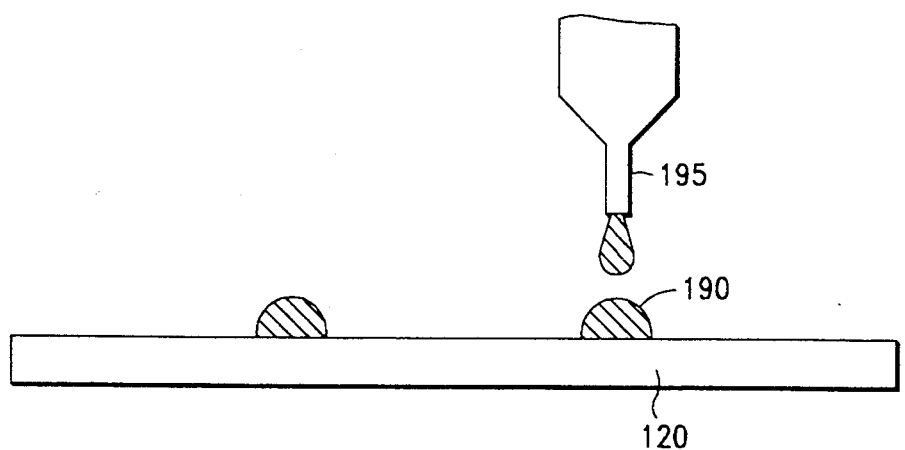
FIG.—6A
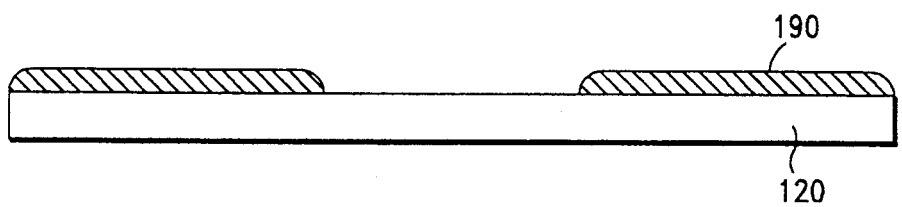
FIG.—6B
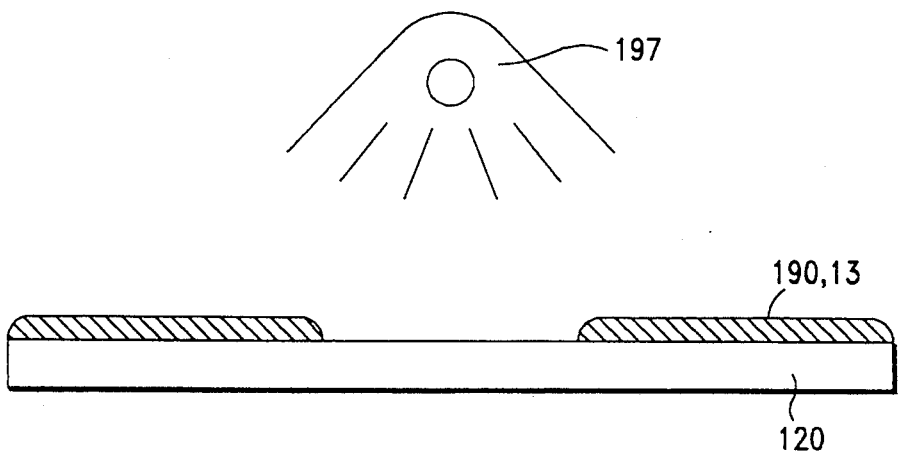
FIG.—6C

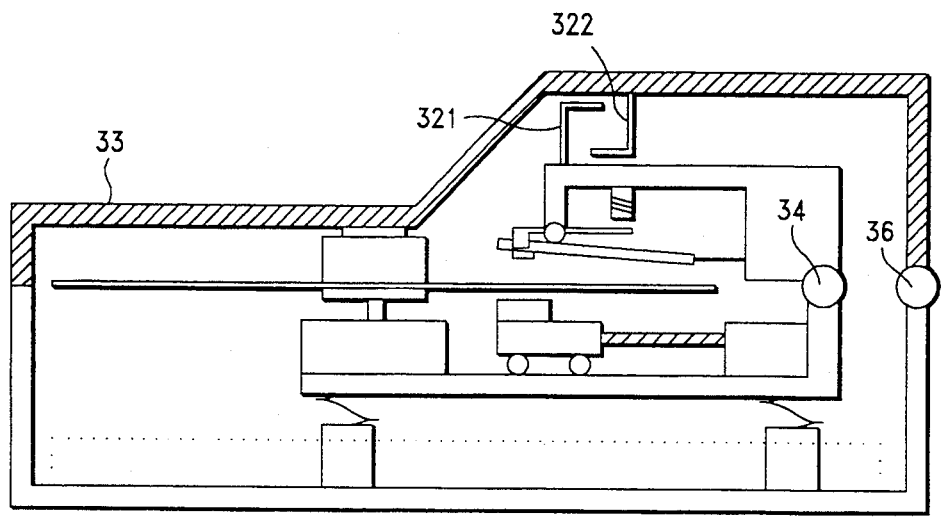
FIG.—12A
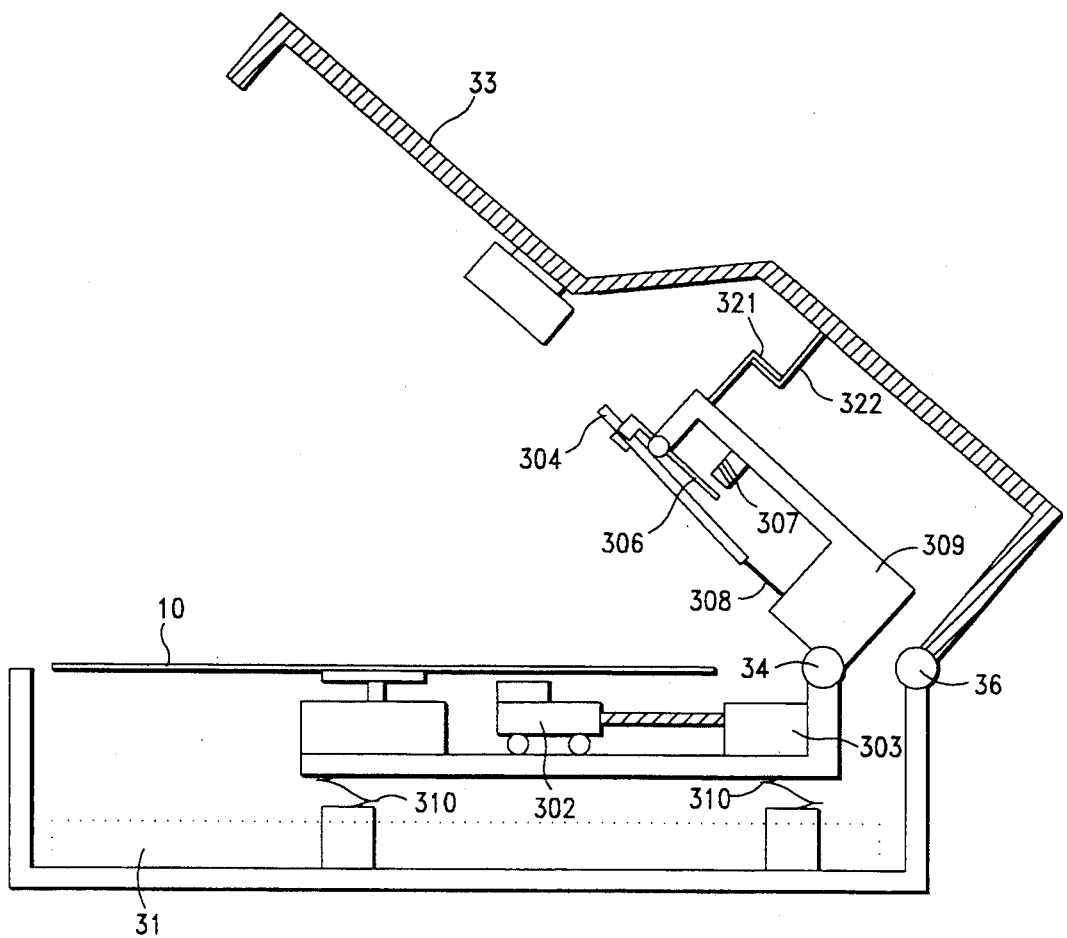
FIG.—12B

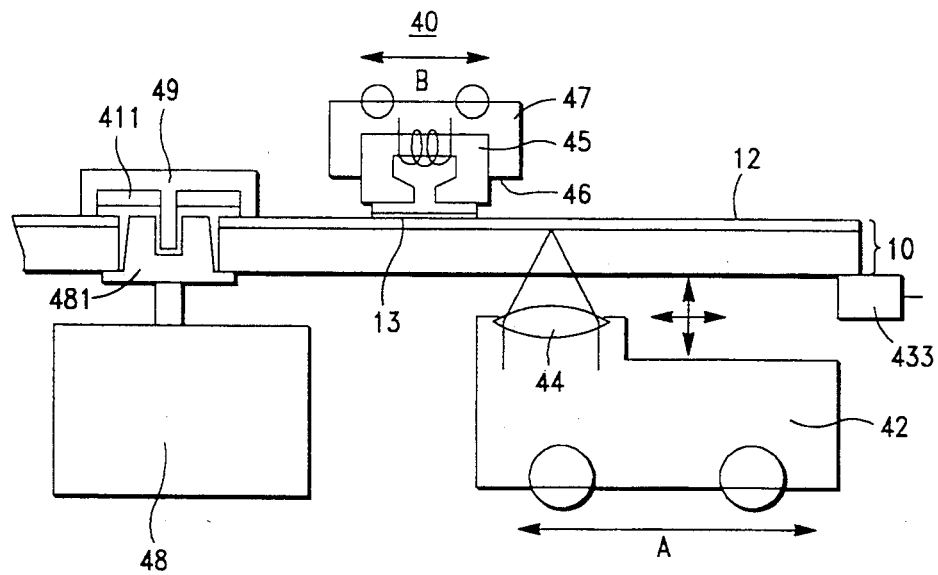
FIG.−13
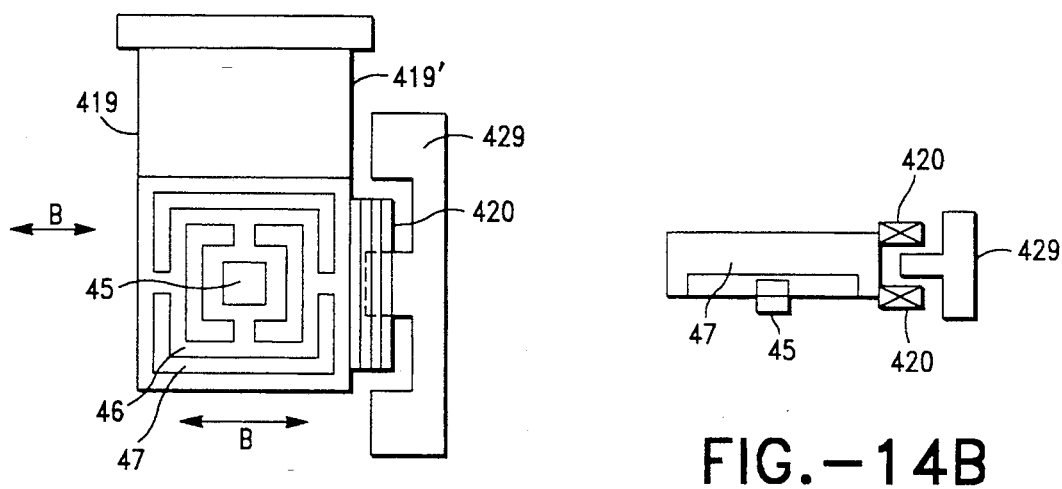
FIG.−14A  FIG.−14B

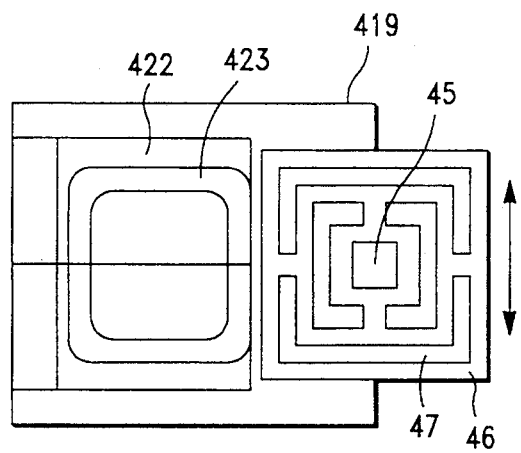
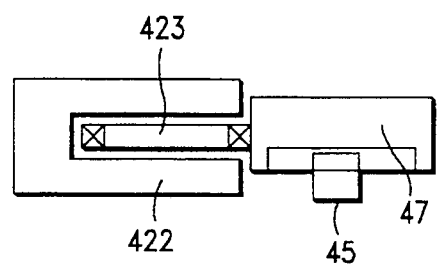
FIG.—15A
FIG.—15B
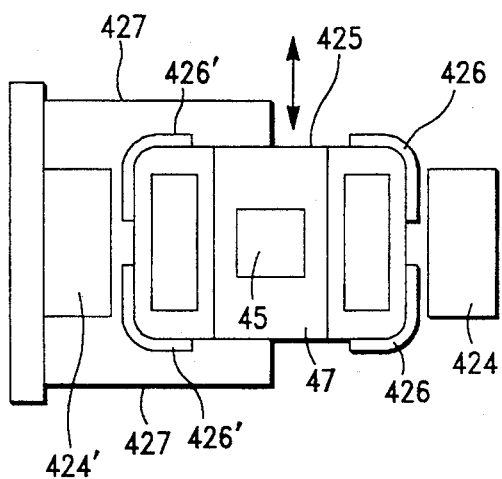
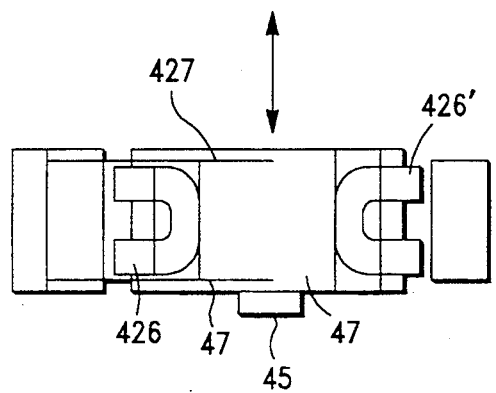
FIG.—16A
FIG.—16B

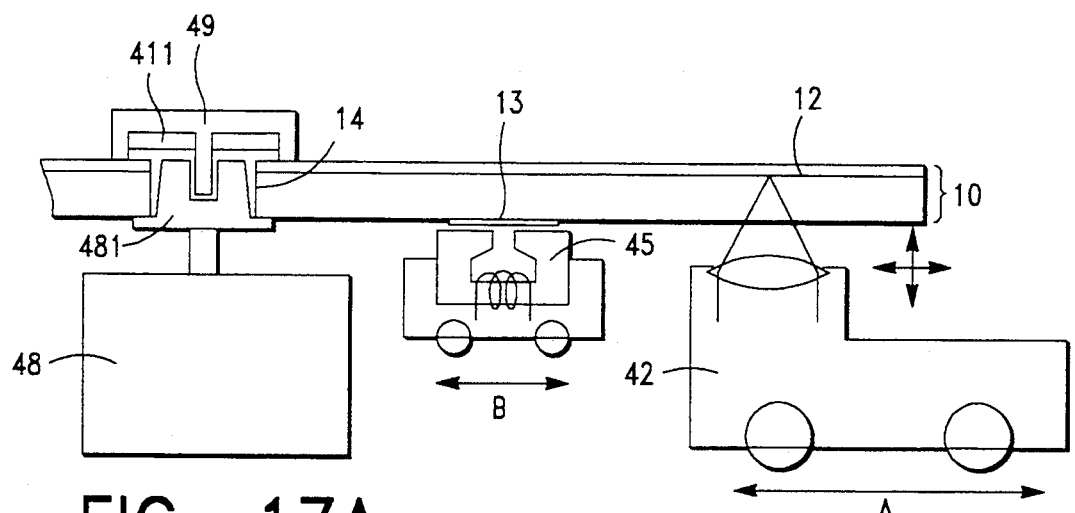
FIG.—17A
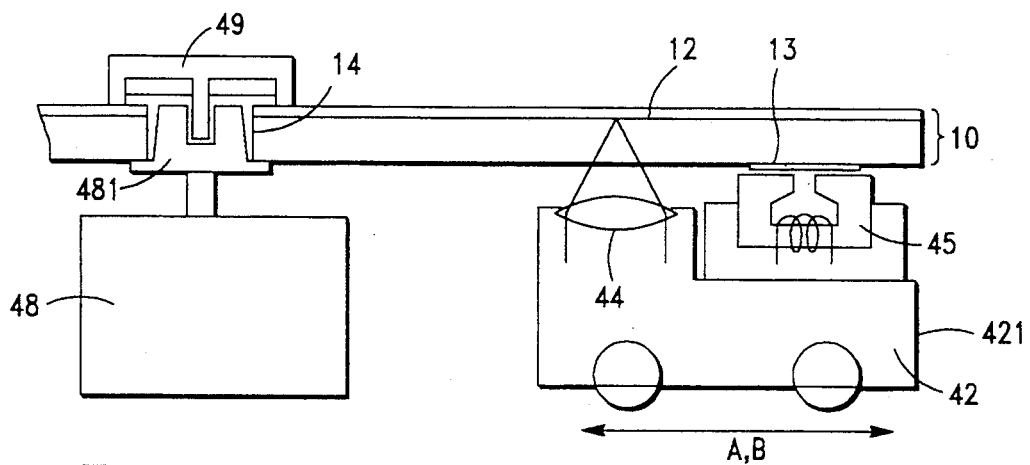
FIG.—17B
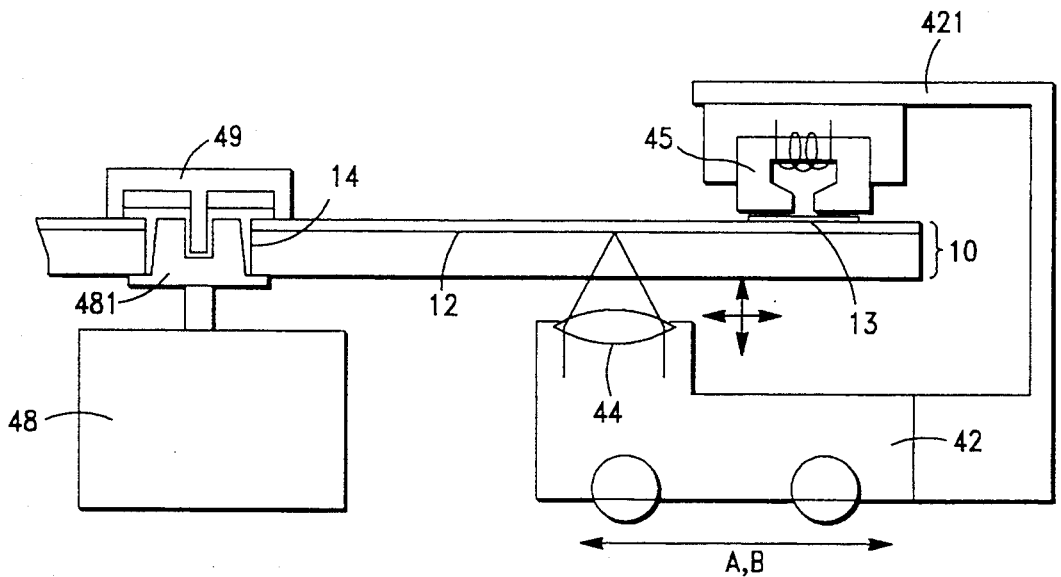
FIG.—17C

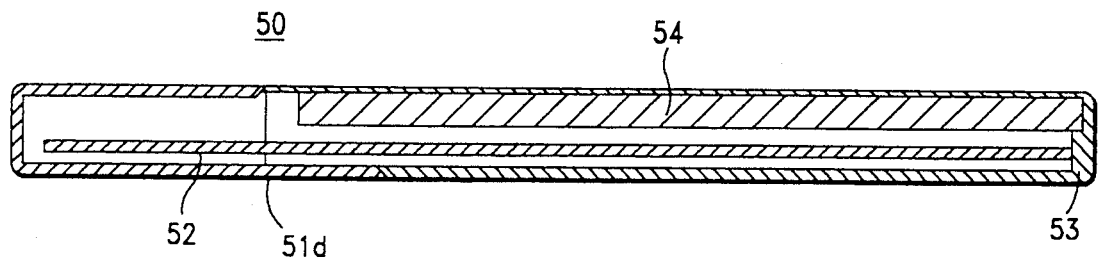
FIG.—21
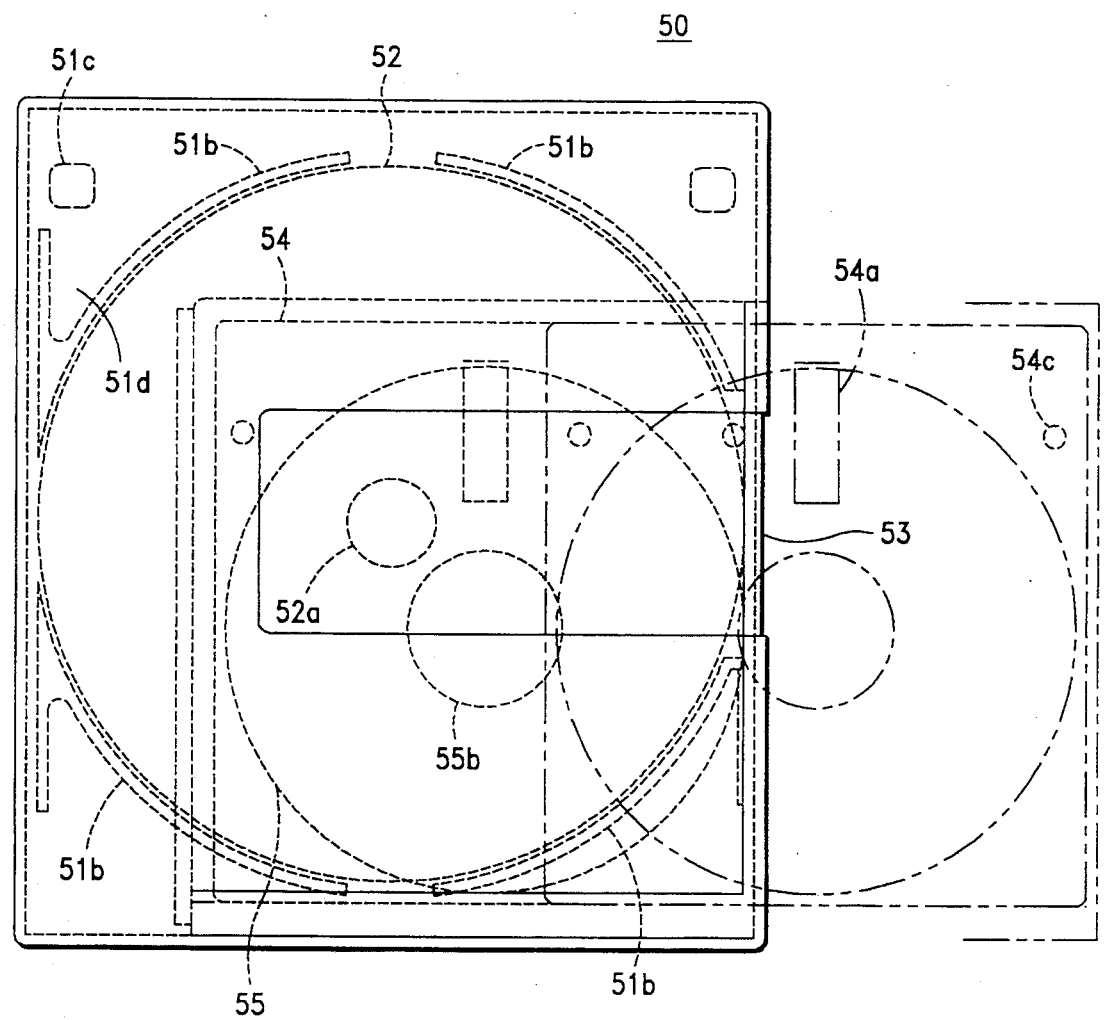
FIG.—22

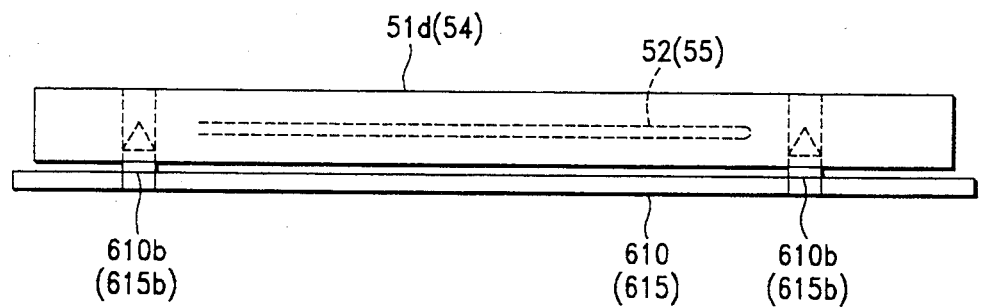
FIG.−30
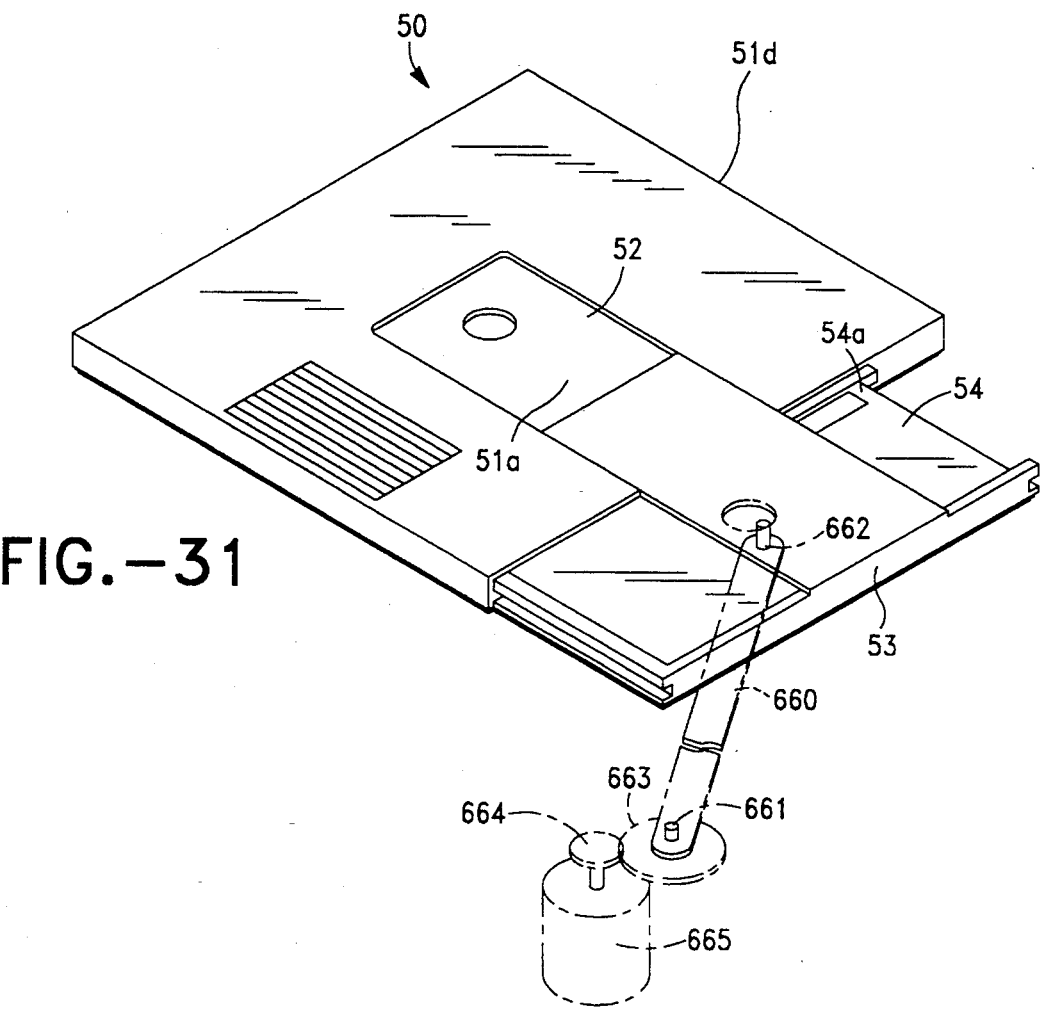
FIG.−31

INFORMATION STORAGE MEDIUM, METHOD OF FABRICATING SAME, AND DRIVE UNIT FOR SUCH MEDIUM

BACKGROUND OF THE INVENTION

The present invention relates to an information storage medium, a method of fabricating this medium, and a drive unit for such a medium. More particularly, the invention relates to an information storage medium having information storage portions performing different methods of recording and a drive unit such as a disk drive capable of writing and reading information to and from such an information storage medium.

Read-only optical storage media such as CD-ROMs are typical information storage media. Since these read-only optical storage media have large storage capacities, they are used in game machines and in other applications. However, it is difficult to rewrite the contents of the read-only optical storage media. Therefore, it is impossible to record intermediate results of processing. A photoelectromagnetic storage disk has been developed as a rewritable disk having a large storage capacity. Unfortunately, this disk is very expensive. In addition, this disk is not compatible with conventional optical storage disks. Therefore, at present, none of these information storage media can fully meet the needs.

SUMMARY OF THE INVENTION

It is an object of the present invention to provide an information storage medium having plural information storage portions recorded by different methods such that only the advantages of these different methods are utilized and their drawbacks are mutually compensated for. This information storage medium has both a read-only optical storage portion and a rewritable magnetic storage portion. The read-only optical storage portion is read optically. The magnetic storage portion can be written and read magnetically. The optical storage portion has a large storage capacity but it is difficult to rewrite its contents. The magnetic storage portion has a small storage capacity but can be easily rewritten. These two kinds of storage portions are incorporated into one information storage medium. The optical storage portion is used as a ROM, while the magnetic storage portion is employed as a RAM. In this way, an information storage medium which has a large storage capacity and can be rewritten is obtained.

A first type of information storage medium according to the invention comprises an optical storage disk having an optical storage portion, along with a magnetic storage portion formed on the Surface of the disk. Preferably, the optical storage portion has a region storing certain data indicating that the disk contains a magnetic storage portion. Also, it is desired that the magnetic storage portion and the optical storage portion be formed on opposite sides of an information storage medium. Where the information storage medium has an outer case enclosing the body of the medium having both magnetic storage portion and optical storage portion, openings formed in the case for permitting the heads to have access to the two kinds of storage portions are preferably spaced away from each other circumferentially of the body of the medium so that the effect of magnetic flux leaking from the optical head is minimized on the magnetic head.

The above information storage medium is fabricated by a method according to the invention. In this method, a magnetic storage medium having a desired shape is formed from plastic film. A binder is applied to the surface of the film together with a magnetic material. An optical storage disk is bonded to the rear surface of the magnetic storage medium film via an adhesive, thus completing a magnetic storage portion. Alternatively, the optical storage disk is bonded to the rear surface of the magnetic storage medium film, using an adhesive sheet having an adhesive applied to its both sides. This fabrication method is performed on the optical storage disk and thus the conventional method of fabricating optical storage disks can be used directly. Therefore, these fabrication steps are easy to perform. Furthermore, the function of the optical storage disks is not impaired. In the fabrication method using these steps, a magnetic storage medium film may be cut from the plastic film to which the binder is applied together with the magnetic material. In this case, the magnetic storage medium film can be square in shape. Instead of the above steps, the magnetic material can be applied to the front surface of the optical storage disk along with the binder by spin coating. Then, the binder is dried and fixed to form the magnetic storage portion. In another method, a resin which cures when exposed to light is applied by spin coating to the front surface of a reflective film to protect it, the reflective film being formed on an optical storage disk. A magnetic material is dispersed in the protective resin. The protective resin is irradiated with light to cure it, thus forming a magnetic storage portion. In any fabrication method, the title of the optical storage disk is preferably printed before the magnetic storage portion is formed, because the formation of the magnetic storage portion creates a step. A second type of information storage medium according to the invention comprises a first disk forming an optical storage portion and a second disk forming a magnetic storage portion. One of the disks is received in a first casing provided with an opening permitting a head to access the disk. The other disk is mounted on the side of a shutter that opens and closes the opening. In this structure, the other disk is contained in a second casing mounted on the side of the shutter. The second casing is provided with an opening enabling a head to have access to the disk. Preferably, the openings formed in the two casings extend in different directions. Also, the first casing includes an opening for replacement of the disks. This opening is opened by moving the shutter.

Disk drives for use with the above first type of information storage medium often use an optical information reading control mechanism of the constant linear velocity (CLV) system. In other words, when information is read from the optical storage portion, the rotational speed of the information storage medium is controlled in accordance with the information recorded in the optical storage portion in such a way that the scanning line speed of reading light is maintained constant, irrespective of the track position. In this case, when information is written to or read from the magnetic storage portion, the most suitable method for controlling the rotation of the information storage medium is to hold the rotational speed of the medium constant while information is being read from the optical storage portion. Of course, the magnetic storage portion may have a plurality of tracks to increase the storage capacity of the magnetic storage portion. The method of controlling the rotational speed is not limited to the above method, i.e., where the rotational speed is maintained constant.

It is also possible to change the position of the optical head whenever the magnetic head shifts. In the magnetic storage portion, the storage density of the magnetic storage portion may be varied from track to track.

The above disk drive controls the rotational speed of the information storage medium based on the information recorded optically. Therefore, even if data is optically recorded on the information storage medium such that the capacity per track is kept constant, such as in CAV system, the optically recorded data can be retrieved without difficulty. Also, data can be written and read out magnetically without difficulty as in the above method.

In order to prevent the heads or the information storage medium from being damaged, a decision means for making a decision as to whether the loaded information storage medium has a magnetic storage portion and a control means are provided. The control means prevents the magnetic head from contacting the medium in accordance with the decision made by the decision means, if the loaded medium has no magnetic storage portion. The decision means makes the decision based on information read from an optical storage region storing certain data indicating that the optical storage portion of the loaded medium has a magnetic storage portion. The magnetic head writes and reads information to and from the magnetic storage portion. The optical head reads information from the optical storage portion. These two heads are mounted on opposite sides of the loaded information storage medium. Preferably, the disk drive includes a magnetic head-moving mechanism which keeps the magnetic head away from the information storage medium when the magnetic head does not access the medium. The moving mechanism brings the magnetic head into contact with the medium only when the magnetic head accesses the medium. In order to prevent interference between components and to facilitate loading the information storage medium, it is desired to provide a magnetic head support mechanism which elevates the magnetic head while interlocking with a cover that moves upward when the information storage medium is loaded. In this case, the magnetic head is preferably mounted to a securing member via a spring member. A mechanism for moving the optical head is mounted to this securing member. Where the magnetic head and the optical head are spaced apart from each other circumferentially of the medium, the effect of the magnetic flux leaking from the optical head is minimized on the magnetic head.

A drive unit for writing and reading information to and from the above second type of information storage medium comprises an optical reader unit for reading information from the first disk, a magnetic drive unit for magnetically writing and reading information to and from the second disk, and a disk separation-and-loading means. This separation-and-loading means separates the first and second disks from the loaded information storage medium, loads the first disk into the optical reader unit, and loads the second disk into the magnetic drive unit.

Preferably, the disk separation-and-loading means comprises a means for placing the disks in position along the plane of the face of the loaded information storage medium and means for placing the two disks in position in the directions of their thicknesses.

Preferably, the optical reader unit and the magnetic drive unit are disposed adjacent to each other, and the axes of rotation of the spindle motors of these two units extend in parallel and in the same direction. The optical reader unit and the magnetic drive unit are preferably disposed adjacent to each other and mounted on the same chassis. In this case, the chassis has shock-absorbing means to absorb shocks imparted on both units.

In a drive unit according to the invention, disk drive means for use with an information storage medium preferably have connecting means for flexibly connecting the drive unit to the optical storage disk in the first type of information storage medium. If the connecting means act to place the disks in position along the plane of the face of loaded medium, then the means for placing the disks in position in the directions of their thicknesses preferably use magnetic attraction means for making use of a magnetic attractive force.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 3(a)–3(d) are cross-sectional views of an information storage medium according to Embodiment 2 of the invention for illustrating successive steps of fabricating the medium;

FIGS. 6(a)–6(c), are cross-sectional views illustrating successive steps of a method of fabricating a modification of the information storage medium of Embodiment 4;

FIG. 12(a) is a cross-sectional view of an upper cover-driving mechanism that can be used with the drive unit shown in FIGS. 9(a) and 9(b), and in which the upper cover is closed;

FIG. 12(b) is a cross-sectional view similar to FIG. 12(a), but in which the upper cover is opened;

FIG. 13 is a cross-sectional view of a drive unit forming Embodiment 8 of the invention;

FIG. 14(a) is a plan view of the magnetic head and its surroundings of the drive unit shown in FIG. 13;

FIG. 14(b) is a side elevation of the magnetic head and its surroundings shown in FIG. 14(a);

FIG. 15(a) is a plan view of a magnetic head and its surroundings different from the magnetic head and the surroundings shown in FIG. 13;

FIG. 15(b) is a side elevation of the magnetic head and its surroundings shown in FIG. 15(a);

FIG. 16(a) is a plan view of another magnetic head and its surroundings different from the magnetic head and the surroundings shown in FIG. 13;

FIG. 16(b) is a side elevation of the magnetic head and its surroundings shown in FIG. 16(a);

FIG. 17(a) is a cross-sectional view of a drive unit forming a first modification of the drive unit shown in FIG. 13;

FIG. 17(b) is a cross-sectional view of a drive unit forming a second modification of the drive unit shown in FIG. 13;

FIG. 17(c) is a cross-sectional view of a drive unit forming a third modification of the drive unit shown in FIG. 13;

FIG. 21 is a vertical cross section of the disk cartridge shown in FIG. 19;

FIG. 22 is a plan view of the disk cartridge shown in FIG. 19;

FIG. 30 is a schematic side elevation of the drive unit shown in FIG. 24, for showing the condition in which a first or second casing forming a disk cartridge is fully loaded in the corresponding unit;

FIG. 31 is a perspective view of the drive unit shown in FIG. 24, for showing the condition in which the disk cartridge has been loaded;

DESCRIPTION OF THE PREFERRED EMBODIMENTS

Embodiment 1

The information storage medium of Embodiment 1 is described with reference to FIGS. 1(a)–1(c). This storage medium comprises a read-only optical storage portion such as a CD-ROM and a magnetic storage portion made of a magnetic material formed on the optical storage medium. This information storage medium permits reading of information from its optical storage portion and enables information to be written into and read from the magnetic storage portion.

Figure 1A:
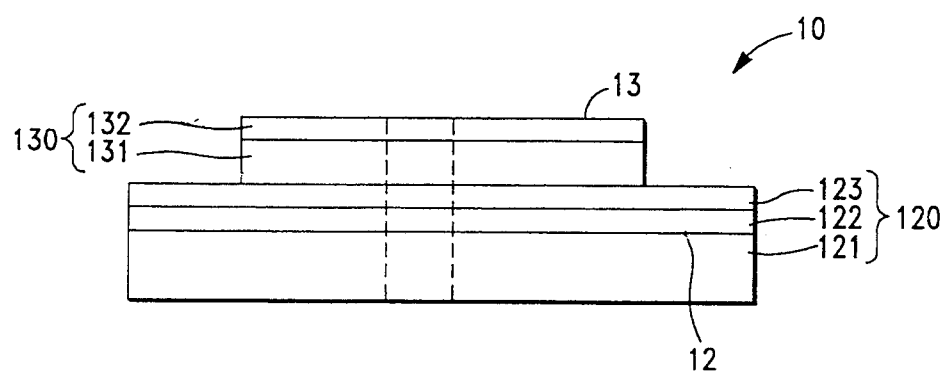
FIG. 1(a) is a cross-sectional view of an information storage medium according to Embodiment 1 of the invention.
Figure 1B:
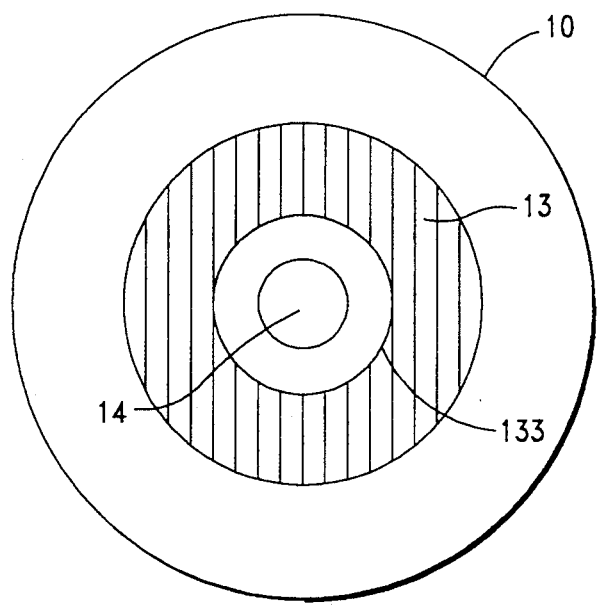
FIG. 1(b) is a plan view of the information storage medium shown in FIG. 1(a)
Figure 1C:
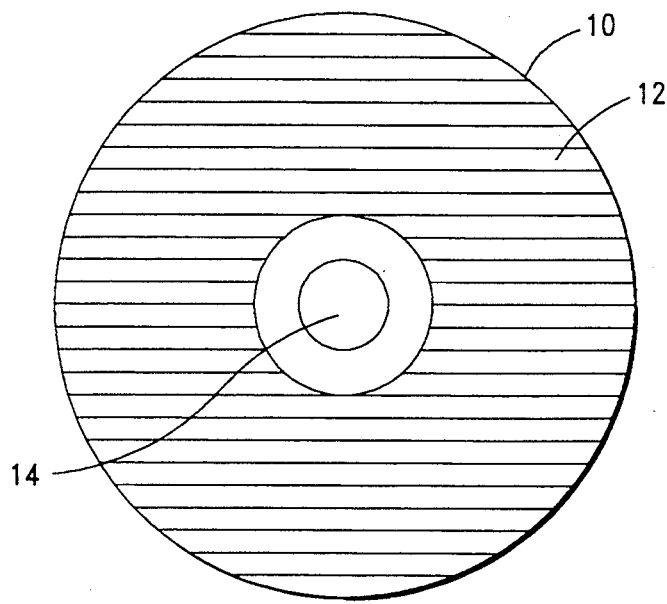
FIG. 1(c) is a bottom view of the information storage medium shown in FIG. 1(a)

FIG. 1(a) is a cross-sectional view of the information storage medium. FIG. 1(b) is a plan view of the medium, showing the front side. FIG. 1(c) is a bottom view of the medium, showing the rear side.

In these figures, information storage medium 10 comprises a read-only optical storage portion such as a CD-ROM 120 and a magnetic storage portion such as a magnetic storage medium sheet 130 bonded to CD-ROM 120. CD-ROM 120 comprises a ROM substrate 121 made of polycarbonate, a reflective film 122 made of an aluminum alloy on the front surface of substrate 121, and a protective film 123 made from a resin that cures when exposed to light. Protective film 123 is formed on reflective film 122 by spin coating. This CD-ROM 120 has the same structure as a conventional CD-ROM.

Magnetic storage medium sheet 130 comprises a plastic base film 131 and a magnetic material 132 applied to the surface of film 131. This sheet 130 is bonded to protective film 123 of CD-ROM 120. The rear surface of sheet 130 and the front surface of protective layer 123 are bonded together via an adhesive. As shown in FIG. 1(c), almost all of the rear surface of information storage medium 10 forms an optical storage portion 12. On the front side of medium 10, magnetic storage medium sheet 130 forms a magnetic storage portion 13 on a part of the front surface of CD-ROM 120, as shown in FIG. 1(b). The medium has a central hole 14 to permit information storage medium 10 to be clamped when it is loaded into a disk drive (not shown). A suitable disk drive may include an optical head, or an optical pickup, for reading information from optical storage portion 12 and a magnetic head for writing and reading information to and from magnetic storage portion 13.

Such a suitable disk drive is capable of reading information from optical storage portion 12 of information storage medium 10 or magnetic storage portion 13. Also, the disk drive is able to record, for example, intermediate results of calculations in magnetic storage portion 13, with the calculations being performed according to the information read out. Therefore, information storage medium 10 combines the functions of a CD-ROM and a floppy disk together and forms a single unit. In particular, information storage medium 10 has optical storage portion 12, which has a large storage capacity but cannot be rewritten, and magnetic storage portion 13, which has a small storage capacity but can be readily rewritten. Optical storage portion 12 is used as a ROM, while magnetic storage portion 13 is used as a RAM. In this way, an information storage medium which has a large storage capacity and can be rewritten can be realized. Therefore, if information storage medium 10 of this embodiment is used in a game machine, processing can be executed while a large amount of information is being read from optical storage portion 12. If the processing is interrupted, information indicating the intermediate condition is recorded in magnetic storage portion 13. When the processing is later resumed, information indicating the intermediate condition is read from magnetic storage portion 13. Thus, processing can be resumed from the interrupted state using the retrieved information.

Since optical storage portion 12 is similar in structure to an ordinary optical storage disk, or a CD-ROM, information storage medium 10 can also be accessed by a conventional disk drive for use with a read-only optical storage medium. Hence, this information storage medium is compatible with the prior art CD-ROM. The fabrication of information storage medium 10 is described below with reference to FIGS. 2(a)–2(e).

First, CD-ROM substrate 121 is molded out of polycarbonate by injection molding, using molding dies. An aluminum alloy is sputtered on one side of substrate 121 to form reflective film 122. Then, protective film 123 is formed on reflective film 122 by spin coating from a resin that cures when exposed to light, thus forming CD-ROM 120. Up to this step, this method is similar to the conventional method of fabricating CD-ROMs. Therefore, detailed description of these steps is omitted here.

Figure 2A:
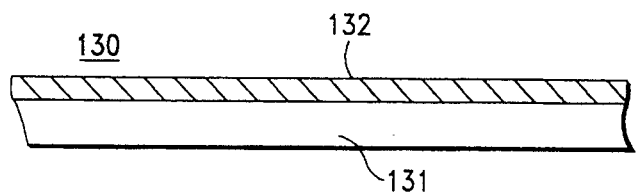
FIGS. 2(a)–2(e) are cross-sectional views of the information storage medium of Embodiment 1, for illustrating successive steps of fabricating the medium.

Then, as shown in FIG. 2(a), magnetic storage medium sheet 130 is prepared. Sheet 130 comprises plastic base film 131 and magnetic material 132 applied on film 131. This sheet 130 is fabricated in the same manner that is used for conventional flexible magnetic disks.

Figure 2B:
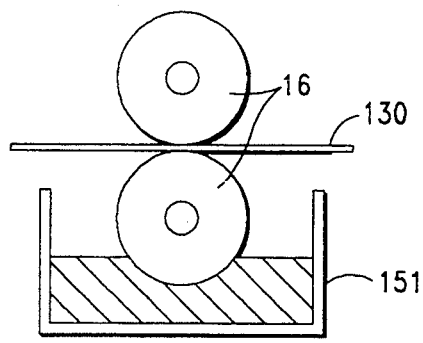

Next, as shown in FIG. 2(b), an adhesive 151 is applied to the rear surface of magnetic storage medium sheet 130 using a pair of rollers 16.

Figure 2C:
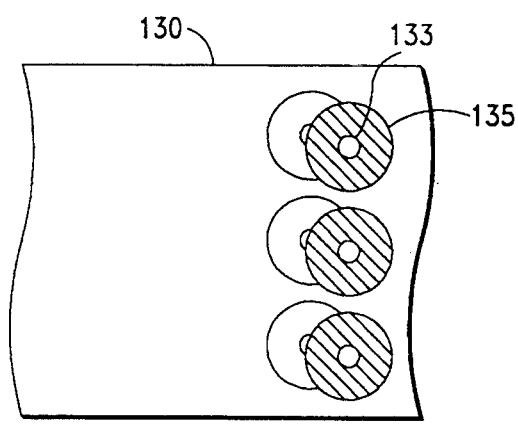
Figure 2D:
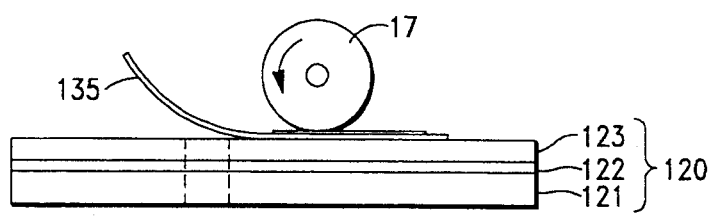

Thereafter, as shown in FIG. 2(c), magnetic storage medium sheet 130 is punched out to form a sheet 135 of a desired shape. As shown in FIG. 2(d), pressure is applied to the surface of CD-ROM 120 by a roller 17 to bond the sheet to the CD-ROM. The bonded region forms magnetic storage portion 13 of information storage medium 10 shown in FIG. 1(b). The rear side of medium 10 forms optical storage portion 12 shown in FIG. 1(c).

In practice, however, information is read from optical storage portion 12 through transparent substrate 121 as shown in FIG. 1(a). Therefore, optical storage portion 12 is located on the same side as magnetic storage portion 13 relative to substrate 121.

Figure 2E:
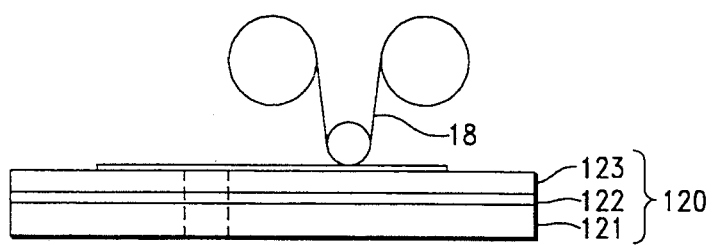

Subsequently, as shown in FIG. 2(e), the surface of magnetic storage portion 13 is ground with abrasive tape 18 to smoothen the movement of the magnetic head. Thus, the fabrication of information storage medium 10 is completed.

In the above fabricating method, the contour of the bonded magnetic storage medium sheet 130, or sheet 135, is circular. However, the contour may have a different shape. Also, if a sufficient number of tracks can be secured in magnetic storage portion 13, the shape of the contour can be quadrilateral. In this case, magnetic storage medium sheet 130 can be punched out without producing any unwanted portions. Furthermore, in FIG. 1(b) and 2(c), there are no limitations on the size and the shape of hole 133 in the center of magnetic storage medium sheet 130, or blanked sheet 135, as long as clamping of medium 10 is not hindered. Additionally, the above grinding step may yield the same advantage if it is performed before magnetic storage sheet 130 is bonded.

Embodiment 2

An alternative fabrication method is illustrated in FIGS. 3(a)–3(c), which are cross-sectional views illustrating some successive steps. It is to be noted that like components are indicated by like reference numerals in the drawings and that those components which have already been described will not be described below.

First, a magnetic storage medium sheet 130 is prepared in the same way as in the fabrication method of Embodiment 1. Then, as shown in FIG. 3(a), a double-sided adhesive sheet 152 is bonded to one side of magnetic storage medium sheet 130.

Next, as shown in FIG. 3(b), sheet 135 of a desired shape is formed by punching out magnetic storage medium sheet 130. Sheet 135 is bonded to the surface of CD-ROM 120 by applying pressure with roller 17 as shown in upper FIG. 3(c). As already described in connection with FIG. 2(e), the surface of magnetic storage portion 13 is ground with abrasive tape 18, thus completing the fabrication of information storage medium 10. The grinding step may yield the same advantage if it is performed before magnetic storage sheet 130 is bonded.

As shown in FIG. 3(d), on information storage medium 10, labels, such as a trademark, etc. are printed with printing ink 136 on protective layer 123 where magnetic storage medium sheet 130 is not bonded. If this is done in the final step, the printing is difficult to perform because a step corresponding to the thickness of magnetic storage medium sheet 130 exists on the surface of protective layer 123. Therefore, after reflective film 122 and protective film 123 are formed on one surface of CD-ROM substrate 121, labels etc., are printed with printing ink 136, as shown in FIG. 3(d). Thereafter, the step of FIG. 3(c) is performed to bond sheet 130 to protective layer 123 via an adhesive layer 150 comprising a double-sided adhesive sheet or an adhesive. In this fabrication method, labels etc. can be printed in the absence of the step created by sheet 130 and thus the printing can be simplified. Furthermore, the degree of freedom with which the labels can be designed is increased. In addition, the printing quality is enhanced.

Embodiment 3

Figure 4:
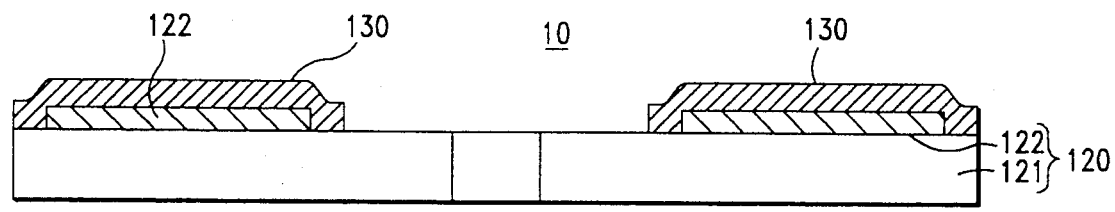
FIG. 4 is a cross-sectional view of an information storage medium of Embodiment 3 of the invention.

The information storage medium of Embodiment 3 of the invention is next described with reference to FIG. 4, which shows a cross-sectional view of this information storage medium. Embodiment 3 further improves Embodiments 1 and 2 and the associated fabrication methods and includes common features and fabricating steps. Since like components are denoted by like reference numerals in the drawings, they will not be described below.

In this information storage medium 10, a reflective film 122 is formed on the front surface of a CD-ROM substrate 121 but no protective coating is formed on the front surface of reflective film 122. Instead, a magnetic storage sheet 130 is bonded to protect reflective film 122. Therefore, sheet 130, or sheet 135, is large enough to extend beyond both inner and outer limits of reflective film 122. The area of magnetic storage portion 13 shown in FIG. 1(b) is wider than that of the optical storage region 12 shown in FIG. 1(c).

In fabricating the above information storage medium, when CD-ROM 120 is manufactured, the protective effect is obtained by bonding magnetic storage medium sheet 130 to reflective film 122 without forming a protective coating on reflective film 122. In this case, sheet 130 is blanked after attaching an adhesive or a two-sided adhesive tape to one side of sheet 130, in the same way as in Embodiments 1 and 2. The size and the shape of sheet 130, or blanked sheet 135, are such that sheet 135 extends beyond both inner and outer limits of reflective film 122. Thus, information storage medium 10 shown in FIG. 4 can be fabricated by bonding sheet 130 to CD-ROM 120.

In the above embodiment, oxidation of reflective film 122 can be avoided by using magnetic storage medium sheet 130 and the adhesive or two-sided adhesive tape without requiring a protective coating on reflective film 122. As a result, the fabricating method is simplified. Labels, such as trademark etc., may be printed on storage medium sheet 130.

Embodiment 4

Figure 5A:
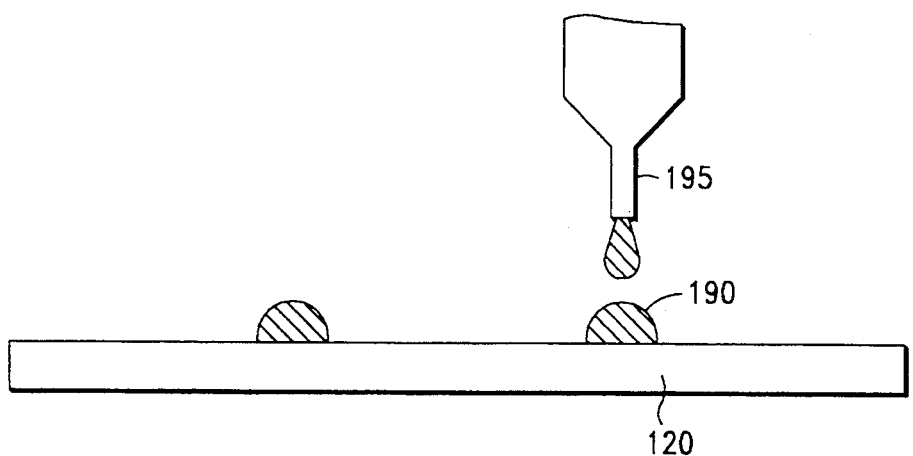
FIGS. 5(a)–5(c), are cross-sectional views of an information storage medium according to Embodiment 4 of the invention, for illustrating successive steps of fabricating the medium.
Figure 5B:
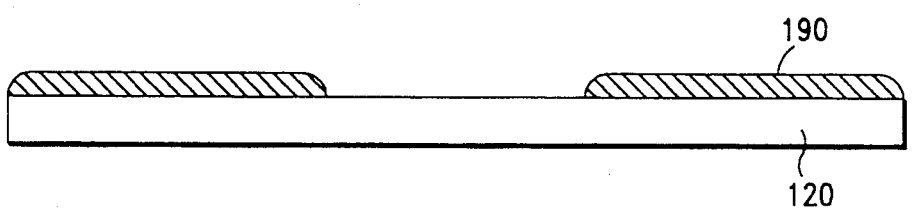

A method of fabricating the information storage medium of Embodiment 4 of the invention is described with reference to FIGS. 5(a)–5(c), which are cross-sectional views illustrating some successive steps. Those components which have been already described in Embodiments 1–3 will not be described below.

CD-ROM 120 is fabricated with the same steps as in Embodiments 1–3. Then, a resin 190 drops onto the front surface, or onto the reflective film, of CD-ROM 120 from a nozzle 195, as shown in FIG. 5(a). Resin 190 includes a binder resin in which a magnetic material is dispersed. Subsequently, resin 190 is applied to the CD-ROM by spin coating, as shown in FIG. 5(b).

Figure 5C:
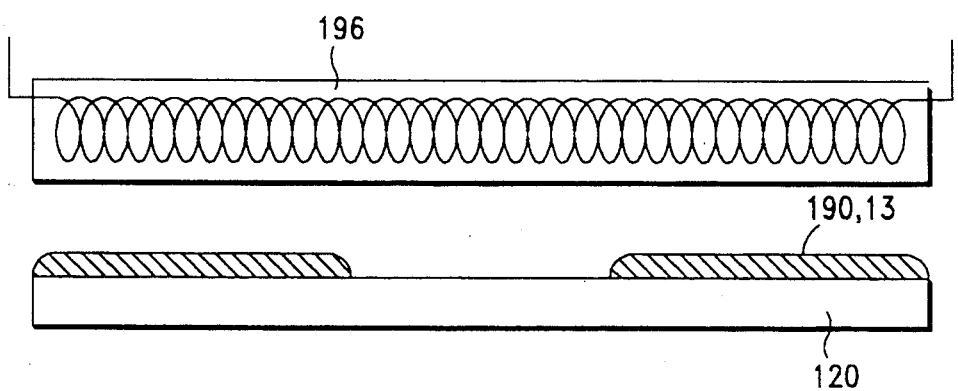

Thereafter, as shown in FIG. 5(c), the resin is heated by a heater 196 to evaporate the solvent component of the binder resin, thus fixing resin 190 on the CD-ROM. In this way, magnetic storage portion 13 is formed.

The surface of that portion of magnetic storage portion 13 on which magnetic information storage tracks are formed is smoothed by using an abrasive tape, thus completing the fabrication of information storage medium 10.

In this embodiment, spin coating is used in applying resin 190, because this resin 190 can be easily and uniformly spread. Any other coating method can be utilized in applying the resin. In this case, magnetic storage portion 13 may be formed on the protective film after the protective film is formed on the front surface of CD-ROM 120, or on the reflective film. Magnetic storage portion 13 may be formed from a resin that cures when exposed to light.

The resin used here is not limited to thermosetting resins. For instance, in an alternative method resin 190 including an optically setting resin in which magnetic powder is dispersed is applied to the front surface, or on the reflective film, of CD-ROM 120 by spin coating or other method, as shown in FIGS. 6(a) and 6(b). Then, as shown in FIG. 6(c), resin 190 is illuminated with ultraviolet rays using an ultraviolet lamp 197, and thus the resin cures. Then, the front surface of magnetic storage portion is polished to finish the information storage medium 10. In this fabrication method, most of the conventional fabrication steps for fabricating CD-ROMs can be used directly. Hence, high productivity is obtained. The polishing step in the fabrication can be omitted if the smoothness and the flatness of the surface of the magnetic storage portion are sufficiently high.

Embodiment 5

A disk drive according to Embodiment 5 of the invention is described with reference to FIG. 7, which is a block diagram of the disk drive. This disk drive can write and read information to and from the disk-shaped information storage medium of Embodiment 1. The disk drive includes an optical reader mechanism for reading information from optical storage portion 12 and a magnetic drive mechanism for writing and reading information to and from magnetic storage portion 13. Disk-shaped storage medium 10 is loaded from one side of the disk drive through hole 14 in the center of medium 10.

Figure 7:
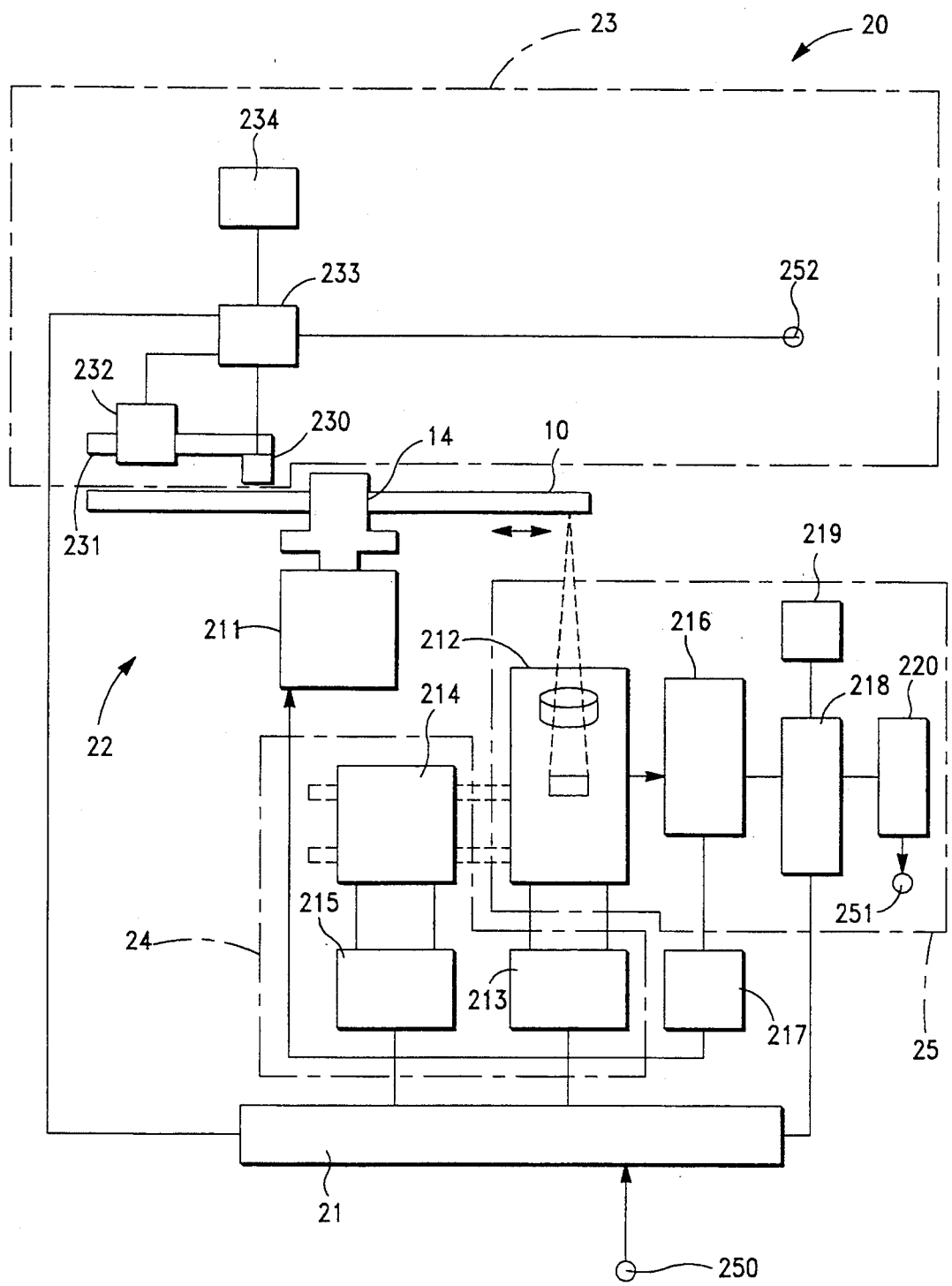
FIG. 7 is a block diagram of a drive unit forming Embodiment 5 of the invention.

As shown in FIG. 7, in disk drive 20, a disk-rotating mechanism 22 clamps and rotates a loaded information storage medium 10 while keeping it horizontal. A magnetic drive mechanism 23 drives a magnetic head 230 to write and read information to and from magnetic storage portion 13 formed on the front surface of information storage medium 10. An optical head drive mechanism 24 drives an optical head 212 to read information from optical storage portion 12 formed on the rear surface of information storage medium 10. A system controller 21 controls the operation of both magnetic drive mechanism 23 and optical head drive mechanism 24. Disk drive 20 also includes an optical information-processing portion (or an optical information reading control mechanism) 25 for processing information read by optical head 212. Based on the results of the processing by processing portion 25, a CLV servomechanism 217 commands disk-rotating mechanism 22 to rotate information storage medium 10 under certain conditions. More specifically, optical information-processing portion 25 controls disk-rotating mechanism 22 in such a way that as the optical head, or an optical pickup, moves away from the center of medium 10, medium 10 is rotated at a slower speed. Furthermore, as the optical head approaches the center of the medium, the medium is rotated at a higher speed. In this way, information is read out at a constant linear velocity (CLV). Consequently, the storage density is enhanced.

Disk-rotating mechanism 22 has a spindle motor 211. Information storage medium 10 is clamped at the front end of the spindle motor 211. The medium can be rotated while maintained horizontal.

Optical head drive mechanism 24 is mounted on the side of the rear surface of information storage medium 10. Optical head drive mechanism 24 includes a sled servomechanism 215, a linear motor 214 for moving optical head 212 radially of medium 10 under the control of servomechanism 215, and a focus tracking servomechanism 213 for focusing optical head 212. Sled servomechanism 215 is controlled by system controller 21 so that information can be read from optical storage portion 12 formed on the rear surface of medium 10. Focus tracking servomechanism 213 controls the vertical position of the optical head with respect to optical storage portion 12 (i.e., provides a focus control) and fine adjusts the radial position of the head with respect to the optical storage portion (i.e., provides a tracking control) according to the instructions from system controller 21. Optical information read by optical head 212 is demodulated by an EFM (eight to fourteen modulation) decoding circuit 216 in optical information-processing portion 25 and then errors contained in the information are corrected by a CIRC (cross-interleave Reed-Solomon codes) error detection portion 218 and an ECC (error correction codes) circuit 220. Finally, the fetched information free from errors appears at an output terminal 251. A RAM 219 included in optical information-processing portion 25 temporarily stores the fetched data. Reading of data from the optical storage disk and correction of the data are carried out under the control of system controller 21. The focus tracking servo control mechanism and the mechanisms for reading information and for correcting the errors are all known and thus these mechanisms are not described here. Of course, other constructions may be employed.

As is well known in the art, in practice, the optical information read by optical head 212 passes through a head amplifier, an analog-to-digital converter circuit, a PLL circuit, etc., before reaching EFM decoding circuit 216. Thus, the analog signal is converted into digital form. Circuitry for these pre-treatments is omitted in FIG. 7. In the following description, it is assumed that these pre-treatments are also performed within the block of EFM decoding circuit 216. Therefore, the clock component (described later) of the retrieved signal is data clock used for EFM decoding and extracted by a PLL at the input stage of EFM decoding circuit 216.

On the other hand, magnetic drive mechanism 23 is disposed on the side of the front surface of information storage medium 10. This mechanism 23 has a magnetic head 230 capable of writing and reading information to and from magnetic storage portion 13 formed on the front surface of medium 10. Magnetic head 230 is connected to a head load/unload mechanism 232 via an arm 231. Load/unload mechanism 232 is controlled according to the instructions from a magnetic storage system controller 233 to command magnetic head 230 to make or break contact with magnetic storage portion 13. A mechanism (not shown) for moving magnetic head 230 radially of information storage medium 10 may also be provided.

Disk drive 20 constructed in this manner has optical head drive mechanism 24 and magnetic drive mechanism 23. Thus, drive 20 can fetch information stored in optical storage portion 12 of information storage medium 10. Moreover, drive 20 can write and read information to and from magnetic storage portion 13.

Figure 8:
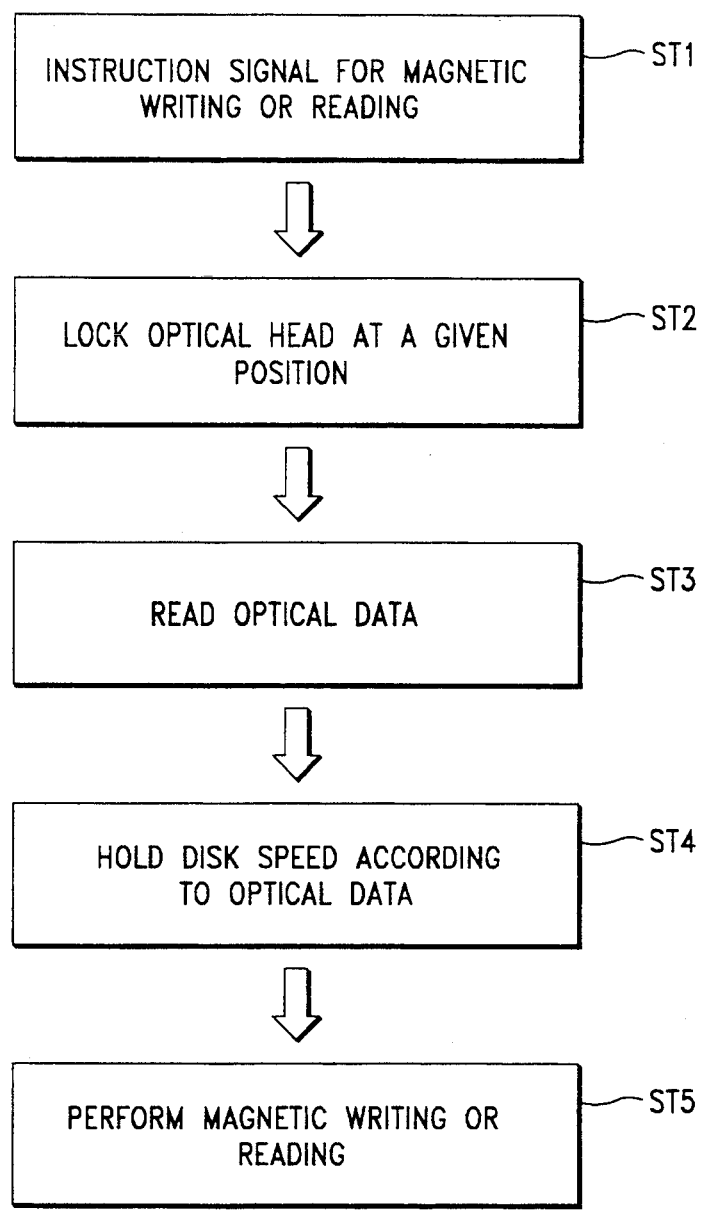
FIG. 8 is a diagram illustrating successive operations of the drive unit shown in FIG. 7 to perform a magnetic recording.

The operation of this disk drive 20 making use of the CLV method will be described in detail later. The rotational speed of the disk is controlled according to the information stored in optical storage portion 12. FIG. 8 illustrates the sequence in which disk drive 20 magnetically writes or reads information to or from the magnetic storage portion 13 of information storage medium 10.

As shown in FIG. 8, in step ST1, an instruction signal for causing disk drive 20 to magnetically write or read information to or from magnetic storage portion 13 is input. Then in step ST2, optical head 212 is locked at a given location above optical storage portion 12.

In step ST3, optical information is read from optical storage portion 12.

In step ST4, the rotational speed of information storage medium 10, or the optical storage disk, is controlled according to the optically stored data to maintain constant.

Thereafter, in step ST5, magnetic writing or reading to or from magnetic storage portion 13 is carried out.

Accordingly, in disk drive 20, if an instruction signal requiring it to magnetically write or read information to or from magnetic storage portion 13 is received, the magnetic writing or reading is not immediately carried out. Rather, optical head 212 is first locked at a given position above optical storage portion 12. Next, optical data is read from optical storage portion 12. Then, the rotational speed of the disk is controlled. When information is written or read to or from magnetic storage portion 13, optical information-processing portion 25 (an optical drive control mechanism) of the CLV method functions as a magnetic drive control mechanism for controlling the rotational speed of information storage medium 10. Thus, the disk rotation control system for reading from optical storage portion 12 is also effectively utilized for magnetic writing and reading. Hence, magnetic reading and writing are performed without requiring additional mechanism.

An example of the above sequential operation of disk drive 20 is described below. First, the method of controlling the rotational speed of the disk when information is read from optical storage portion 12 is described. In the CLV method, data is stored in optical storage portion 12 such that the rate of data transfer is kept constant when the speed of optical head 212 relative to the surface of the disk is maintained at a constant value.

Spindle motor 211 drives information storage medium 10. Optical information is read from optical storage portion 12 by optical head 212 and passes through EFM decoding circuit 216. Then, CLV servomechanism 217 controls spindle motor 211. Thus, the rotational speed of disk-shaped medium 10 is controlled. CLV servomechanism 217 controls the rotation of spindle motor 211 in such a way that the rate of transferring data from optical storage portion 12 through optical head 212 is kept constant.

CLV servomechanism 217 performs the following control operations based on the optical information. When the optical information is demodulated in EFM decoding circuit 216, the line speed obtained at this time is compared with a reference line speed. For this example, the clock component of the retrieved signal is compared with a reference clock signal produced by a quartz oscillator. If they differ, a signal is kept produced to CLV servomechanism 217 such that the rotational speed of motor 211 is changed until the line speed reaches the given reference value. CLV servomechanism 217 controls the rotational speed of motor 211 in accordance with this signal. In FIG. 7, CLV servomechanism 217 is shown to control the rotational speed of motor 211 without using system controller 21. The rotational speed may also be controlled by using the following method. The optical information from optical head 212 is fed to system controller 21, which reads the rate of transferring the optical information. Based on the read rate, controller 21 gives instructions to CLV servomechanism 217. In either case, data is stored in optical storage portion 12 such that the rate of transferring data is kept constant when the speed of optical head 212 relative to information storage medium 10 is maintained at a constant value. The rotational speed of medium 10 is controlled in such a manner that the rate of transferring the data read from optical storage portion 12 by optical head 212 is maintained constant. Therefore, the rotational speed of medium 10 is controlled at a desired value by locking optical head 212 at a given position. As a result, in the CLV method, as optical head 212 moves away from the center of medium 10, this medium rotates at a lower speed. As the head approaches the center of medium 10, the medium rotates at a higher speed. In this way, high-density recording is accomplished. Thus, CLV servomechanism 217 operates in the manner described above during the operation of reading optical information.

The magnetic writing and reading are performed in the manner described below. Data is written to and read from magnetic storage portion 13 of the disk via the magnetic head 230. This head 230 is mounted on arm 231. Head load/unload mechanism 232 brings magnetic head 230 into or out of contact with magnetic storage portion 13. Specifically, when data is written to or read from magnetic storage portion 13, magnetic head 230 is in contact with magnetic storage portion 13; otherwise, head 230 is not in contact with magnetic storage portion 13. A RAM 234 temporarily stores data which is to be written to or read from magnetic storage portion 13. Data stored or to be stored there is transferred through an input-output portion 252 for magnetic information. Once a signal sent from system controller 21 to load or unload magnetic head 230 is received by magnetic storage system controller 233, controller 233 sends the signal to head load/unload mechanism 232.

Magnetic storage system controller 233 modifies the waveform of the data read out, detects errors contained in the data, and performs other operations. These functions of system controller 233 can be performed by various other portions. For example, wave-shaping can be performed by inserting a head amplifier or the like between magnetic head 230 and magnetic storage system controller 233. Also, detection of errors contained in data may be performed by system controller 21.

Magnetic head 230 is loaded and unloaded under the control of head load/unload mechanism 232. Magnetic head 230 magnetically writes and reads information under the control of magnetic storage system controller 233. The timing of the loading and unloading and the operations of magnetic writing and reading are described below. The magnetic writing and reading are performed in the sequence illustrated in FIG. 8.

In FIG. 8, in step ST1, an instruction signal for causing disk drive 20 to magnetically write and read information to and from magnetic storage portion 13 is input. For example, a signal for reading magnetically stored information is sent to an input portion 250 of system controller 21 from the outside.

Then, in step ST2, optical head 212 is locked at a certain position above optical storage portion 12 of information storage medium 10, in the same way as in the method of reading optical information described above. In other words, system controller 21 produces a signal to sled servomechanism 215 for moving optical head 212 into a given position. Sled servomechanism 215 moves linear motor 214 in accordance with this signal. Optical head 212 is moved linearly and radially of medium 10. If external information is read into a register, memory, or the like in system controller 21 and the controller controls the whole system based on the information, then the operation for locking optical head 212 at a given position is done by inputting an instruction signal to lock the head at the given position in a similar manner as inputting the external signal.

Then, in step ST3, optical data is read from optical storage portion 12. In this example, data is read from optical storage portion 12 via optical head 212. The focus tracking servo control associated with the reading control operation, the method of reading the signal, and the method of controlling the rotation of the disk are similar to those used during the reading of optical information and these will not be described below.

In step ST4, the rotational speed of information storage medium 10 is controlled to maintain constant based on optically stored data. This control operation is carried out in the same way as the control operation performed when optical information is read out. In other words, optical information is read from optical storage portion 12 of medium 10 via optical head 212 and passes through EFM decoding circuit 216. CLV servomechanism 217 controls spindle motor 211, whereby the rotational speed of the disk is controlled.

Subsequently, in step ST5, information is magnetically written or read to or from magnetic storage portion 13 of medium 10. After or just before the rotational speed of the disk is maintained constant, system controller 21 produces a magnetic head load signal to magnetic storage system controller 233. This controller 233 instructs head load/unload mechanism 232 to bring magnetic head 230 into contact with magnetic storage portion 13. This permits information to be magnetically written or read to or from the magnetic storage portion. This magnetic head load signal is produced after an instruction signal for magnetic writing or reading is sent to system controller 21 after or just before the rotational speed of the disk settles at a given value. What is important is that the timing at which information is magnetically written or read is controlled after the reading of optical data is performed and the rotational speed of the disk is stabilized. After the line speed has become a predetermined constant value, the rotational speed of spindle motor 211 is maintained. Then, information is magnetically written or read.

As described above, magnetic writing or reading is not immediately carried out in response to the writing or reading instructions. Rather, optical head 212 is first locked at a given position. Next, optical data is read from optical storage portion 12. Then, the rotational speed of the disk is controlled in accordance with this data. In other words, the disk drive operates in the sequence illustrated in FIG. 8. Consequently, optical information-processing portion 25, which includes the disk rotation control system and the optical information reading control mechanism and is used during the reading of optical information, can also be effectively used during magnetic writing and reading.

It should be noted that disk drive 20 described in connection with FIG. 7 is only exemplary. Other control system may also be used as long as it controls the rotational speed of disk-shaped information storage medium 10 by using the control system which controls the rotational speed of medium 10 after the position of optical head 212 is locked at a given position and optical information is read during magnetic writing and reading as illustrated in the sequence of FIG. 8.

In disk drive 20, magnetic storage portion 13 is formed on the front surface of information storage medium 10. Optical storage portion 12 is operated from the opposite side of the magnetic storage portion. Therefore, optical head 212 and magnetic head 230 are disposed on opposite sides of medium 10. Consequently, it is easy to manufacture medium 10. Also, the various mechanisms of disk drive 20 can be readily and properly positioned. Where magnetic storage portion 13 is formed on the same side as the operation of optical storage portion of storage medium 10, optical head 212 and magnetic head 230 may be mounted on the same side of medium 10.

In this embodiment, if the position of magnetic head 230 for magnetically writing and reading information is locked, the amount of data stored in magnetic storage portion 13 is limited to the capacity of 1 track. Where magnetic recordings are made in a plurality of tracks to increase the amount of recorded data, plural magnetic heads 230 are mounted. Alternatively, magnetic head 230 is driven by a magnetic head-moving mechanism using a stepper motor such as in a conventional magnetic drive unit so that the head can write and read information to and from plural tracks. Where the amount of information magnetically stored is so small that a plurality of tracks are not needed, vibration of the face of the disk can be suppressed and the operation can be stabilized by bringing a dummy head similar to the magnetic head into contact with the disk. Where magnetic storage portion 13 has plural tracks, it is easy to magnetically write and read information without modifying the rotational speed of medium 10 when magnetic head 230 moves. It is also possible to improve the storage density in magnetic storage portion 13 by carrying out steps ST2–ST4 of the sequence illustrated in FIG. 8 whenever magnetic head 230 is moved.

In disk drive 20, system controller 21 and magnetic storage system controller 233 can be combined into a unit. RAM 234 used to write and read data to and from magnetic storage portion 13 can be an internal memory of system controller 21 or other memory.

In disk drive 20, system controller 21 produces a signal to lock optical head 212 at a given position after an instruction signal for magnetic writing or reading is sent to system controller 21. However, the present invention is not limited to this method. For instance, a generally used, the so-called pause method may also be used to lock the head at a given position. In other words, reading is halted at a certain optical storage track while the disk keeps rotating. The above method of controlling the disk in magnetically writing and reading information can be used as long as optical head 212 is locked within the tolerances of the rotational speed required for magnetic writing and reading. Accordingly, if the position of optical head 212 is locked and the rotational speed of the disk is determined based on the information read from the disk under this condition, then optical head 212 may be mechanically locked when information is written to read or from the magnetic storage portion.

In disk drive 20, the rotation of the disk is controlled in accordance with the optically retrieved information in such a way that the rate at which data is optically read from information storage medium 10 is maintained constant. Therefore, the reading can be performed without difficulty even if the CAV method is used, i.e., the amount of optically stored data is uniform throughout every turn of physical track on storage medium 10. In this case, the rotational speed is constant regardless of the location of the medium from which information is read. Furthermore, information storage medium 10 can be divided into zones having different radii, and the CAV method can be used in each zone. The amount of information obtained per revolution varies from zone to zone. This is known as a ZCAV method and can also be utilized without difficulty. Information can be magnetically written and read to and from magnetic storage portion 13 while the rotation of the disk is controlled in accordance with optical information in a similar sequence. In order to write and read data to and from magnetic storage portion 13 in the above CLV system, optical head 212 must read a particular track. However, if data is stored in optical storage portion 12 by the CAV method, then the track read by optical head 212 need not be a particular one. In other words, the method used by disk drive 20 is not limited to the CLV method if such information is stored in the disk that can keep its rotational speed within a tolerable range.

Where magnetic storage portion 13 has plural tracks, if optical data is stored by the CAV method and information is stored in every track on magnetic storage portion 13 at the same rotational speed, then there are no problems. In the CLV servomechanism described above, the clock component of the fetched signal is compared with the reference clock signal. If the system for processing the fetched signal has a sufficient bandwidth, then the storage density can be changed from track to track during writing or reading to or from magnetic storage portion 13 by modifying the frequency of the reference clock signal.

The CLV and CAV methods are summarized in Table 1 below. In Table 1, the optical head position indicates the position assumed when information is written or read to or from magnetic storage portion 13.

TABLE 1

| Optical Storage Portion | Magnetic Storage Portion | Optical Head Position |
|---|---|---|
| WHERE MAGNETIC STORAGE PORTION HAS ONLY ONE TRACK | | |
| CLV | | fixed position |
| CAV | | arbitrary position |
| WHERE MAGNETIC STORAGE PORTION HAS PLURAL TRACKS | | |
| CLV | constant capacity | fixed position |
| CLV | variable capacity | varied among magnetic storage tracks |
| CAV | constant capacity | arbitrary position |
| CAV | variable capacity | arbitrary position (with the use of a rotation control system) |

In this way, disk drive 20 can find broad applications. Where the CLV method is used in recording optical information as in the first example, the disk drive is quite advantageous in terms of capacity. Where magnetic storage portion 13 has plural tracks, if information is written and read to and from magnetic storage portion 13 at the same rotational speed, then the method can be implemented most easily.

As to the method of loading a disk into the disk drive, either one of the following two methods can be used: (1) in a front loading method, the disk is loaded from the front surface of the disk drive; (2) in a second method, the disk is loaded from the above of the disk drive and then the disk is locked by an upper cover. In either case, the accuracy with which the disk is aligned with the magnetic head is maintained by rigidly mounting the magnetic head to the spindle motor for the optical storage portion or to a mount on which optical head 212 is mounted. Also, external vibration can be isolated. In order to prevent the disk from contacting the magnetic head when the disk is loaded, the second method using the upper cover is desired. In this case, the magnetic head is mounted on the upper cover. However, it is difficult to obtain a high accuracy in aligning the magnetic head with the disk, because the upper cover itself is not directly mounted to the mount. In addition, external vibration is easily transmitted to the magnetic head. Accordingly, the arm to which the magnetic head is mounted is made movable. The pivot of this arm is firmly mounted to the mount. Consequently, the magnetic head can be aligned with the disk with a high accuracy. Furthermore, external vibration is not easily transmitted to the magnetic head.

In a further modification, either the magnetic head or the arm is connected via a movable portion to a disk-locking cover that is not directly mounted to the mount. When the disk is inserted, the magnetic head and the arm are moved upward together with the disk-locking cover. In this way, the magnetic head can be aligned with the disk with a high accuracy. Additionally, external vibration is not easily transmitted to the magnetic head.

Embodiment 6

An information storage medium and a disk drive according to Embodiment 6 of the invention are next described. This information storage medium improves the information storage medium of Embodiment 1. This disk drive improves the disk drive of Embodiment 5. Thus, this information storage medium has essentially the same structure as the information storage medium of Embodiment 1. Also, this disk drive has essentially the same structure as the disk drive of Embodiment 5. Therefore, this embodiment is described below with reference to FIGS. 1, 7, and 8.

In this embodiment, information permitting detection of an optical storage disk having magnetic storage portion 13 is stored, for example, in optical storage portion 12 of information storage medium 10. This information allows disk drive 20 of this embodiment to identify whether the loaded disk is information storage medium 10 of any one of Embodiments 1–4. More specifically, in optical storage portion 12 of information storage medium 10, or a CD-ROM having a magnetic storage portion, shown in FIG. 1, a certain identification signal is recorded at the front end of the first block storing user's data. For example, this signal may be a part of the title of a tune. However, the contents and the storage location of the identification signal are preferably uniform throughout every CD-ROM having a magnetic storage portion. If the disk is found not to be an optical disk having magnetic storage portion 13, then the control section including system controller 21 and magnetic storage system controller 233 gives instructions to prevent the magnetic head from making contact with information storage medium 10. On the other hand, if the disk is found to be an optical storage disk having magnetic storage portion 13, and if necessary, the magnetic head is allowed to make contact with information storage medium 10. To provide identification information, medium 10 is received in a case. The case is provided with a concave, a convex portion, or a hole. The presence or absence of such a concave is detected to determine the type of the loaded information storage medium.

For this purpose, in disk drive 20, before information is magnetically written or read, optical head 212 is moved to a location of optical storage portion 12 in which the identification signal should be recorded. At this location, the signal is read to determine whether it is an identification signal indicating the presence of a magnetic storage portion. If the signal is the identification signal, the loaded optical disk is an optical storage disk or an information storage medium 10 having the magnetic storage portion according to any one of Embodiments 1–4. Then, if necessary, magnetic head 230 is pressed against the disk surface. On the other hand, if the retrieved signal is found not to be the identification signal, then the loaded optical storage disk does not have the magnetic storage portion and, thus, the magnetic head does not operate. Magnetic head 230 is allowed to make contact with information storage medium 10 or kept away from the medium by head load/unload mechanism 232 under the control of system controller 21 and magnetic storage system controller 233. In this case, if system controller 21 finds that the optical storage disk has no magnetic storage portion, then an error message is produced to inform the user of this fact. The disk drive can be designed so that it can be used either with the optical storage disk having the magnetic storage portion or with a conventional optical storage disk having no magnetic storage portion.

The identification signal can be recorded at any desired location in optical storage portion 12. In this embodiment, the identification signal is recorded in the foremost region of the first block storing user's data. Consequently, disk drive 20 can prevent both magnetic head 230 and information storage medium 10 from being damaged. Furthermore, the amount of electric power consumed is low. In addition, stable operation is possible.

In these cases, the locked position of optical head 212 for controlling the rotational speed of the disk during magnetic writing and reading may or may not be coincident with the locked position of optical head 212 for making a decision as to whether the optical storage disk includes the magnetic storage portion. When these two positions differ, the above sequence is modified. First, optical head 212 tries to read the signal indicating that the optical storage disk has the magnetic storage portion. If this signal is successfully read, then the head moves to the location in which the signal for controlling the rotational speed for magnetic writing and reading is recorded.

On the other hand, when the two positions are the same, the above two operations can be carried out in one operation. This simplifies mechanical operations. In this case, the same locked position as the position for finding whether the disk has the magnetic storage portion can be employed. As one method of controlling the rotational speed of the disk, a frequency converter means such as a frequency division means or a frequency multiplication means is used before the comparison means which compares the clock component of the retrieved optical information with the reference clock signal. For example, if a $\frac{1}{2}$-frequency division means is added to receive the reference clock before the comparison means, then the rotational speed of the disk can be halved. If a $\frac{1}{2}$-frequency division means is added to receive the retrieved optical signal before the comparison means, then the rotational speed can be doubled. A PLL can be used as a further frequency converter means. In this case, any desired rotational speed of the disk can be derived. In other words, the rotational speed of the disk during magnetic writing and reading can be made different from the rotational speed of the disk determined from the optical disk as described in the previous embodiments by adding an arithmetic processing means to the conventional disk rotation control mechanism. In this method, magnetic writing and reading can be performed outside the frequency range in which optical information is read.

An identification signal indicating that the disk has the magnetic storage portion is recorded on information storage medium 10 at the location where a disk drive used only for a conventional optical storage disk starts to read information. Thus, if information storage medium 10 of any one of Embodiments 1–4 is loaded into the conventional disk drive used only for the conventional optical storage disk, incorrect loading of the disk can be detected.

Embodiment 7

Figure 9A:
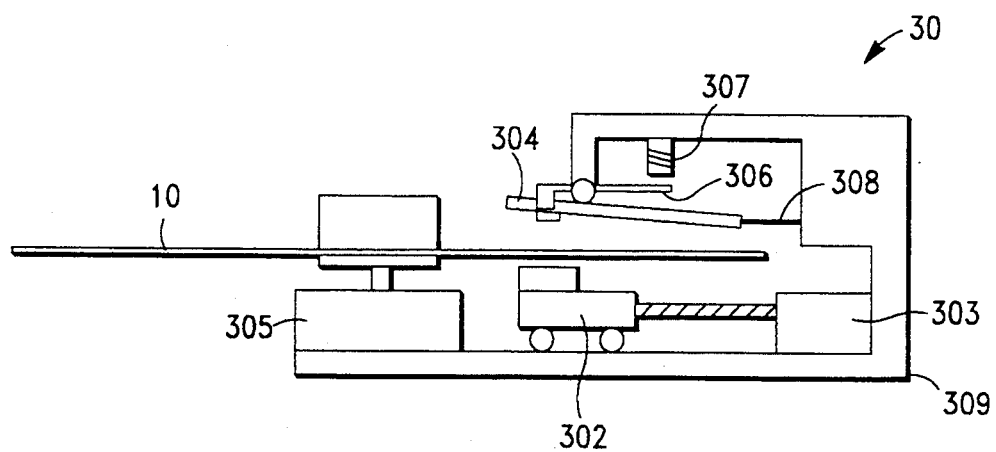
FIG. 9(a) is a cross-sectional view of the mechanical portion of a drive unit according to Embodiment 7 of the invention, for illustrating the placement of the mechanical portion.
Figure 9B:
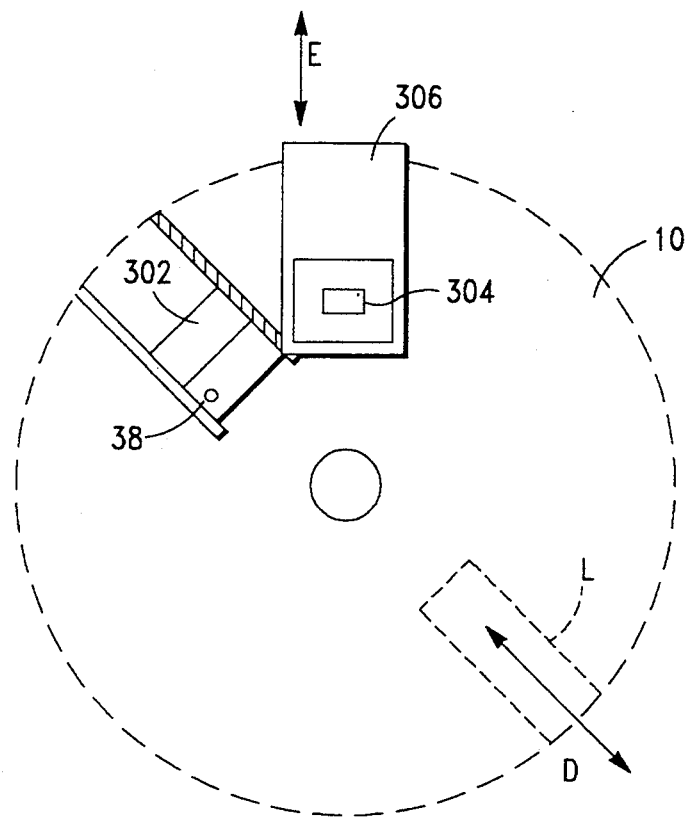
FIG. 9(b) is a plan view of the optical head and the magnetic head of the drive unit shown in FIG. 9(a)

FIG. 9(a) is a cross-sectional view of the mechanical portion of a disk drive according to Embodiment 7 of the invention. FIG. 9(b) is a plan view showing the positional relation between its optical head and its magnetic head. The disk drive of this embodiment improves the disk drive of Embodiment 5 and can access information storage medium 10 of Embodiment 1 shown in FIG. 1. Therefore, only the features of this disk drive are described below.

In FIG. 9(a), disk drive 30 has an optical head 302 for reading information from optical storage portion 12 of information storage medium 10 shown in FIG. 1 and an optical head drive mechanism 303 for driving the optical head. Further, disk drive 30 has a magnetic head 304 for writing and reading information to and from magnetic storage portion 13 of medium 10 and a magnetic head-elevating mechanism 306 for moving the magnetic head up and down. Disk drive 30 also includes a spindle motor 305 for rotating medium 10 while holding it horizontally. When medium 10 is in this condition, optical head 302 and magnetic head 304 are disposed on opposite sides of medium 10. Optical head 302 can be moved radially of medium 10 by optical head drive mechanism 303. Magnetic head 304 can be moved upward or downward by magnetic head-elevating mechanism 306 to make or break contact with magnetic storage portion 13 while supported by a spring mechanism 308. More specifically, a solenoid 307 is mounted above elevating mechanism 306. When magnetic head 304 writes or reads information, solenoid 307 is energized to pull the end of elevating mechanism 306 upward. Magnetic head 304 which has been raised elevating mechanism 306 comes into contact with magnetic storage portion 13. When magnetic head 304 is in contact with medium 10, elevating mechanism 306 is not in contact with magnetic head 304. When magnetic head 304 neither writes nor reads, a mechanism incorporated within the pivot of magnetic head-elevating mechanism 306 exerts a force in such a direction that the magnetic head 304 is raised from magnetic storage portion 13, or the disk surface.

As shown in FIG. 9(b), optical head 302 and magnetic head 304 are spaced from each other circumferentially of medium 10. An objective lens actuator 38 is mounted on one side of optical head 302 for shifting the objective lens in the direction in which the face of medium 10 vibrates and toward the eccentric axis for controlling the laser spot by a servomechanism. Since the objective lens actuator 38 includes a solenoid actuator, magnetic flux leaks to the surroundings. However, magnetic head 304, which is made of a material of a high magnetic permeability, is easily affected by external magnetic flux. To avoid the effects of the leaking flux in disk drive 30, optical head 302 and magnetic head 304 are not arranged on the same circumference of information storage medium 10 but are spaced apart from each other circumferentially. Hence, the reliability of the operation of magnetic head 304 is enhanced even if a protective layer of Permalloy is not formed on magnetic head 304.

When information storage medium 10 is enclosed in a cartridge to keep away dust, an opening is formed in one of the front and rear surfaces of the cartridge for allowing access to optical storage portion 12. Another opening is formed in the other surface of the cartridge for allowing access to magnetic storage portion 13. These separate openings are spaced apart from each other circumferentially of medium 10 to minimize the effect of the leaking flux on magnetic head 304. In this embodiment, as shown in FIG. 9(b), optical head 302 and magnetic head 304 are spaced about 135° from each other circumferentially of medium 10. In other words, magnetic head 304 forms an angle of approximately 45° with respect to an extension line of the seek direction of optical head 302. However, there are no limitations on the positional relationship between optical head 302 and magnetic head 304. Especially, where the number of the tracks of optical storage portion 12 and those of magnetic storage portion 13 are increased, both heads have long strokes as indicated by arrows D and E, respectively. Even in this case, their respective drive mechanisms do not place restrictions on their relative arrangement and operation.

Figure 10:
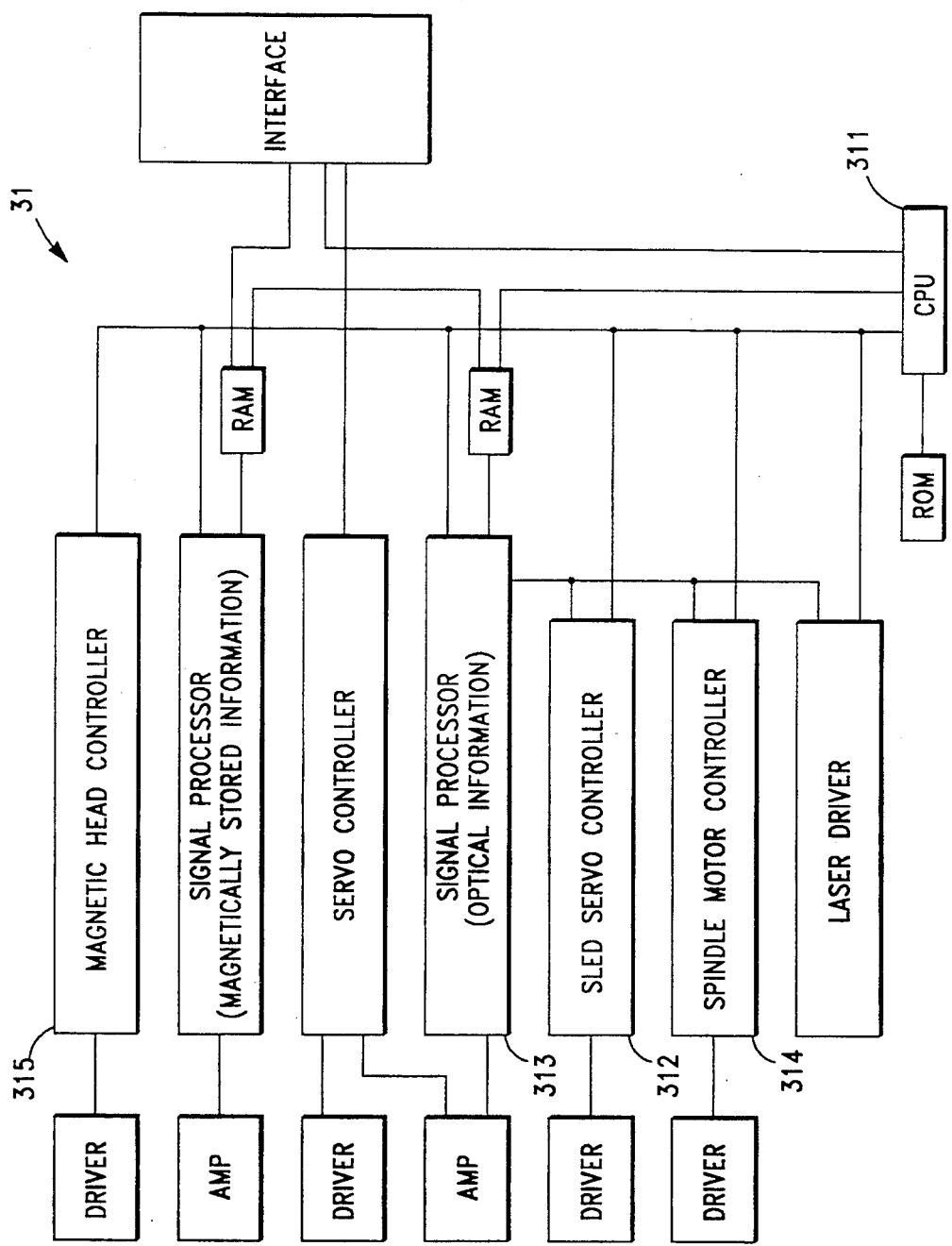
FIG. 10 is a block diagram of the controller portion of the drive unit shown in FIGS. 9(a) and 9(b)

FIG. 10 is a block diagram of the controller of disk drive 30. The operation of disk drive 30 is now described with reference to FIGS. 9 and 10. Since the controller of disk drive 30 is essentially identical in structure with the disk drive of Embodiment 5 and thus only those portions associated with the operation are described below.

In these figures, if a CPU 311 incorporated in controller 31 receives an instruction to write information to magnetic storage portion 13, then CPU 311 causes a sled servo controller 312 to move optical head 302 to a given position. After optical head 302 has moved to the given position, the disk drive pauses. Spindle motor 305 is controlled via a spindle motor controller 314 based on the information supplied to a signal processor 313 from optical head 302. Thus, the rotational speed of information storage medium 10 is maintained at a desired value. Consequently, the disk drive can operate with information storage medium 10 such as a CD-ROM from which optical information is read at a constant linear speed. In other words, where the linear speed is constant in reading information, the rotational speed is determined by the radial position of the track. Therefore, the rotational speed is maintained constant by moving optical head 302 to a given position and continuing to read a given track.

Then, magnetic head 304 is brought into contact with information storage medium 10 via a magnetic head controller 315, and data is recorded in magnetic storage portion 13. When the recording of the data is completed, magnetic head 304 is moved away from medium 10, thus completing the operation. When data is read from magnetic storage portion 13, similar operations are performed. Also, in this case, when information is read from optical storage portion 12, an optical drive control mechanism controls the rotational speed of the medium 10 to maintain the linear speed of the optical head 302 constant irrespective of the position of the track, based on the information stored in optical storage portion 12. When information is written to or read from magnetic storage portion 13, the optical drive control mechanism controls the rotational speed of medium 10 based on the information stored in optical storage portion 12 to maintain the linear speed of magnetic head 304 constant, and magnetic recording is performed.

As described above, in disk drive 30, magnetic head 304 is brought into or out of contact with information storage medium 10. Therefore, if a read-only optical storage disk without magnetic storage portion 13 is loaded, magnetic head 304 does not contact the read-only optical storage disk. Hence, neither the disk nor magnetic head 304 is damaged.

In disk drive 30, optical head 302 and magnetic head 304 are spaced apart from each other circumferentially such that they do not lie on the same circumference on medium 10. Therefore, magnetic flux leaking from objective lens actuator 38 does not affect magnetic head 304.

Figure 11:
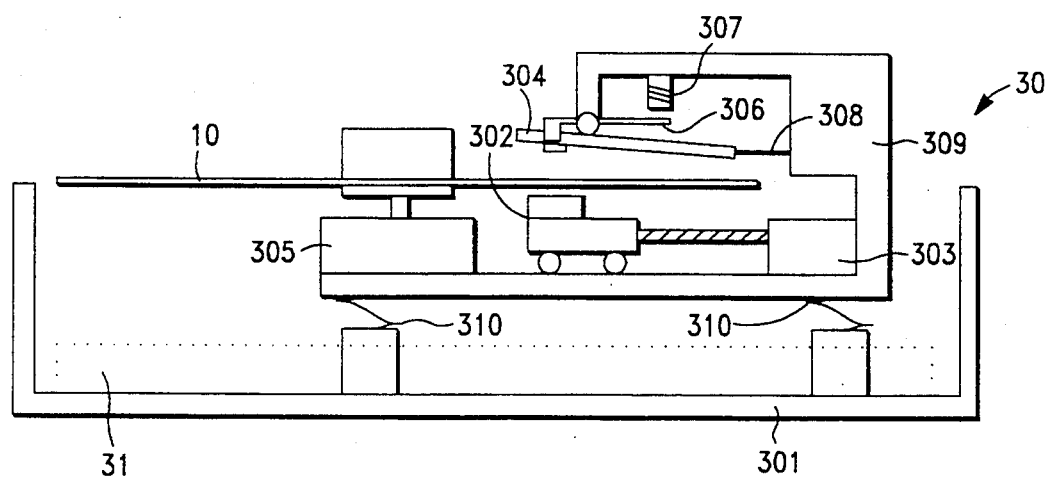
FIG. 11 is a cross-sectional view of the vibration-isolating structure of the drive unit shown in FIGS. 9(a) and 9(b)

Optical head 302 is operated by a servomechanism so that the spot of the emitted laser beam is kept focused onto optical storage portion 12 of information storage medium 10. Accordingly, if external vibration is transmitted to optical head 302 or to medium 10, then the servomechanism may not properly function. To prevent this, in disk drive 30, spindle motor 305, optical head 302, and its optical head drive mechanism 303 are rigidly mounted on a frame 309 which is firmly secured to an outer frame 301 for the disk drive 30 via a vibration-isolation mechanism 310, as shown in FIG. 11. Magnetic head 304 is mounted via spring mechanism 308 to vibration-proof frame 309. In this way, magnetic head 304 vibrates as analogously as possible with medium 10. Hence, the positional relation between magnetic head 304 and magnetic storage portion 13 cannot be easily changed. Thus, the recording position does not shift. Accordingly, after information is written to magnetic storage portion 13 of medium 10 by disk drive 30, if medium 10 is read by other disk drive, the reading can be carried out with certainty. In this way, high compatibility is obtained.

Magnetic head-elevating mechanism 306 includes a damper mechanism filled with unwoven cloth to prevent magnetic head 304 from making a sudden contact with medium 10. Therefore, immediately after magnetic head 304 makes contact with medium 10, the rotational speed of spindle motor 305 does not vary. In consequence, additional writing or reading can be immediately initiated.

Disk drive 30 can be designed so that when medium 10 is loaded or unloaded, an upper cover 33 mounted above medium 10 is rotated about a hinge 36 and raised, as shown in FIG. 12(b). To prevent magnetic head 304 from hindering the operation of medium 10 when it is inserted, hooks 321 and 322 are made to function together simultaneously with the upward movement of upper cover 33. Magnetic head 304 is raised about hinge 34 together with magnetic head-elevating mechanism 306. When upper cover 33 is closed, medium 10 and upper cover 33 are locked in such a way that they are not in contact with each other, as shown in FIG. 12(a).

Embodiment 8

The disk drive of Embodiment 8 of the invention is described with reference to FIG. 13. In all of Embodiments 1–7, the magnetic storage portion of each information storage medium has only one track and thus in the disk drives, the magnetic heads are not moved radially of their media. In this embodiment, the size of the magnetic storage portion of the information storage has as many as 10 tracks for example. In this embodiment, the clamping mechanism for clamping the disk is improved. As shown in FIG. 13, disk drive 40 is capable of storing and retrieving data from an information storage medium 10 having a read-only optical storage portion 12 and a magnetic storage portion 13 that can be magnetically rewritten. The clamping mechanism for clamping medium 10 comprises a conic hub 481 for fixedly attaching medium 10 to a spindle motor 48 and a cap 49. The securing force of this clamping mechanism comes from a magnet 411 mounted inside cap 49. In the clamping mechanism, central hole 14 in medium 10 is located just above spindle motor 48. Under this condition, cap 49 is moved downward. Hub 481 is placed inside central hole 14 in medium 10. Thus, medium 10 is clamped to motor 48.

In disk drive 40, optical storage portion 12 serves as a ROM. Information is stored in this optical storage portion 12 in the form of pits in the same way as in conventional CDs. Optical head 42 for reading information from this optical storage portion is connected either to a slide mechanism using bearings or to a moving mechanism utilizing a screw mechanism and can be moved radially of medium 10 as indicated by an arrow A. Since the track pitch of optical storage portion 12 has a very small value of 1.6 $\mu$m, fine adjustment of the tracking is made by finely moving an objective lens 44 radially of medium 10. To reduce vibrations of the face of medium 10, objective lens 44 is moved perpendicularly to medium 10 to bring the lens into focus. These techniques described thus far have been generally used in the conventional optical disk drives for CDs. Also, in disk drive 40, when information is retrieved from optical storage portion 12, the optical information reading control mechanism controls the rotational speed of medium 10 to maintain constant the scanning line speed of the light from optical head 42 (i.e., the CLV method) based on the information stored in optical storage portion 12, irrespective of the position of the track. When information is written or read to or from magnetic storage portion 13, the optical information reading control mechanism controls the operation of magnetic head 45 in accordance with the information stored in optical storage portion 12 to store and retrieve information by the CLV method.

In disk drive 40, magnetic head 45 is flexibly mounted to a carriage 47 via a resilient gimbal 46 so that head 45 certainly responds to vibrations of the face of medium 10 and makes close contact with magnetic storage portion 13. Carriage 47 moves linearly radially of medium 10. In particular, magnetic head 45 is moved horizontally as indicated by an arrow B while pressed against medium 10 by the resilience of gimbal 46, and writes information to plural tracks. In order that magnetic head 45 touches medium 10 with improved reliability, the load imposed on spindle motor 48 increases slightly. If necessary, rollers 433 may be mounted on the outer periphery of medium 10.

As shown in FIGS. 14 (a) and 14 (b), the mechanism for moving magnetic head 45 described above has carriage 47 that supports head 45 via gimbal 46. This carriage 47 is held to two leaf springs 419 and 419'. A coil 420 is mounted cylindrically around carriage 47 and arranged coaxially with a magnetic circuit 429. An electrical current passed through coil 420 produces a driving force which acts on carriage 47 horizontally in the direction indicated by arrow B. Leaf springs 419 and 419' are bent, and magnetic head 45 moves across magnetic storage portion 13.

As shown in FIGS. 15 (a) and 15 (b), a driving force that drives magnetic head 45 (or carriage 47) horizontally can also be produced by forming a gap inside a magnetic circuit 422, setting the directions of the produced magnetic fields at two opposite walls in such a way that they are opposite to each other, and inserting a coil 423 horizontally into the gap. Coil 423 is mounted on the side of carriage 47 where the carriage holds magnetic head 45 via gimbal 46.

Figure 18:
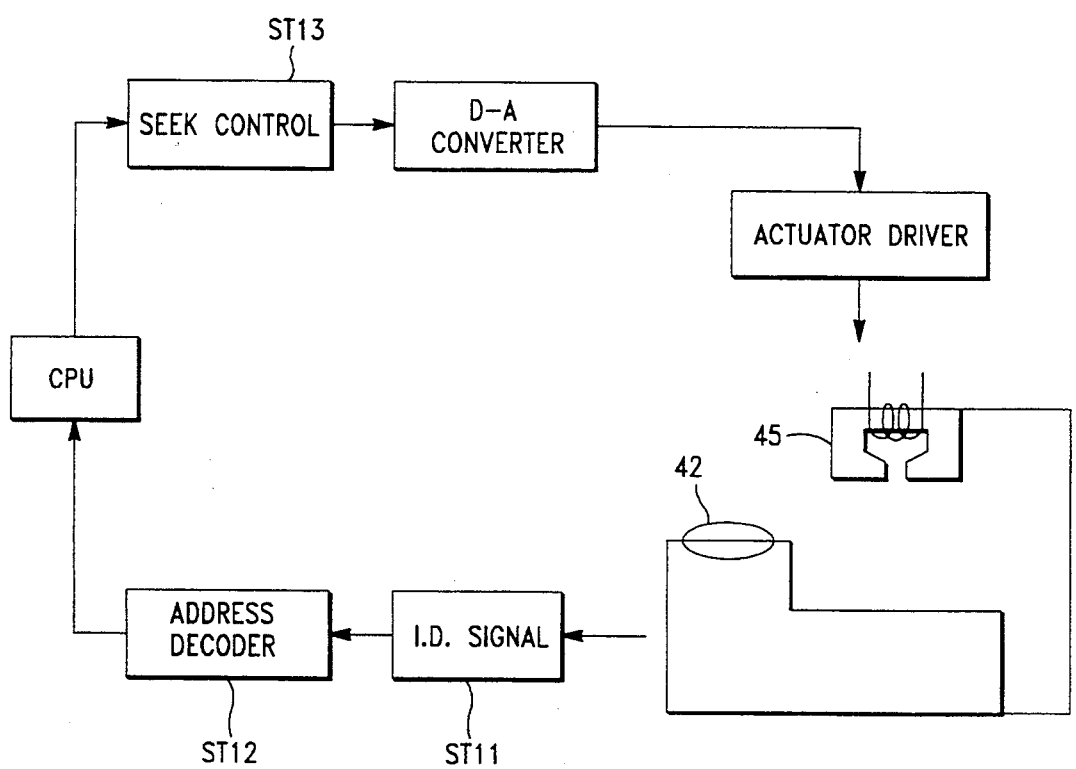
FIG. 18 is a diagram illustrating successive steps performed by the drive unit shown in FIG. 17, (b) and (c), for moving the magnetic head.

In FIGS. 16 (a) and 16 (b), a solenoid actuator is used to move magnetic head 45 horizontally. A mechanism for moving the magnetic head vertically can also be used on the actuator itself. More specifically, carriage 47 on which magnetic head 45 is mounted is supported by four wires 427. Magnetic circuits 424 and 424' are arranged parallel to and outside coil 425 and coils 426 and 426' located at the four corners. Coil 425 is mounted on the side of carriage 47. When the head is moved horizontally by the solenoid actuator, wires 427 bend horizontally. When magnetic circuits 424 and 424' apply a force to carriage 47 vertically to coils 426 and 426' at the four corners, wires 427 bend vertically. Therefore, the degree of closeness with which magnetic head 45 makes contact with medium 10 can be adjusted by bending wires 427 either vertically or horizontally.

Where both optical storage portion 12 and magnetic storage portion 13 are formed on the same side of information storage medium 10, both optical head 42 and magnetic head 45 can be disposed on the same side of medium 10, as shown in FIG. 17(a). Those components which corresponds to their counterparts in disk drive 40 are denoted by like reference numerals. In this case, as shown in FIG. 17(b), magnetic head 45 can be mounted to a chassis 421 for optical head 42. Where optical storage portion 12 and magnetic storage portion 13 are formed on opposite sides of information storage medium 10, in order to fabricate optical head 42 and magnetic head 45 integrally, chassis 421 is bent around medium 10 with magnetic head 45 being mounted on the side of the front surface of the medium, as shown in FIG. 17(c). In this way, the two heads can be moved as a unit and thus the driving system is simplified. Furthermore, addresses in magnetic storage portion 13 are retrieved by optical head 42, and magnetic head. 45 is moved based on the retrieved addresses. Moreover, the track pitch of magnetic storage portion 13 is about 100 times as large as the track pitch of optical storage portion 12. Consequently, the accuracy with which magnetic head 45 locates the track position is improved. Specifically, as illustrated in FIG. 18, when magnetic recording is performed, optical head 42 reads an optical identification (ID) signal from optical storage portion 12 of information storage medium 10 (step ST11). The ID signal is decoded into an address signal (step ST12). In step ST13, the CPU instructs the actuator driver to seek for the magnetic storage portion. In this way, magnetic head 45 is controlled.

In disk drive 40 constructed in this way, if the CPU receives an instruction to write information to magnetic storage portion 13, optical head 42 moves into a given position and then pauses. Spindle motor 48 is controlled in accordance with the optical information obtained from the optical pickup of optical head 42, and the rotational speed of the medium 10 is maintained at a given value. More specifically, when reading is performed at a constant linear speed, the rotational speed is determined by the radial position. Then, optical head 42 is moved into a given position, and a given track continues to be read out. As a result, the rotational speed is maintained constant. Then magnetic head 45 writes data while in contact with medium 10. When the writing is completed, magnetic head 45 moves away from medium 10. Thus, in disk drive 40, magnetic head 45 can be brought into and out of contact with medium 10. Therefore, even when a read-only optical storage medium without magnetic storage portion 13 is loaded, magnetic head 45 does not touch the read-only optical storage disk. This prevents both disk and magnetic head 45 from being damaged.

Embodiment 9

An information storage medium according to Embodiment 9 of the invention is described next with reference to FIGS. 19–23. The disk in this embodiment is different from a single disk having both optical storage portion and magnetic storage portion. Here, an optical storage disk and a magnetic storage disk are enclosed in a cartridge, which constitutes an information storage medium.

Figure 19:
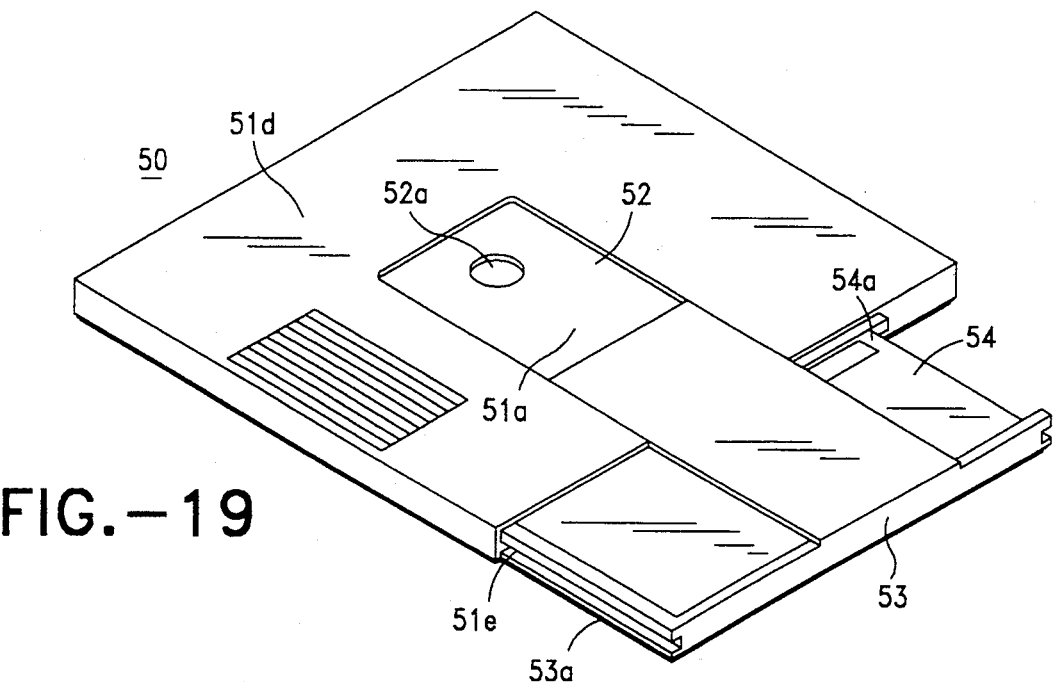
FIG. 19 is a perspective view of a disk cartridge used as an information storage medium forming Embodiment 9 of the invention, and in which a shutter is opened.
Figure 20:
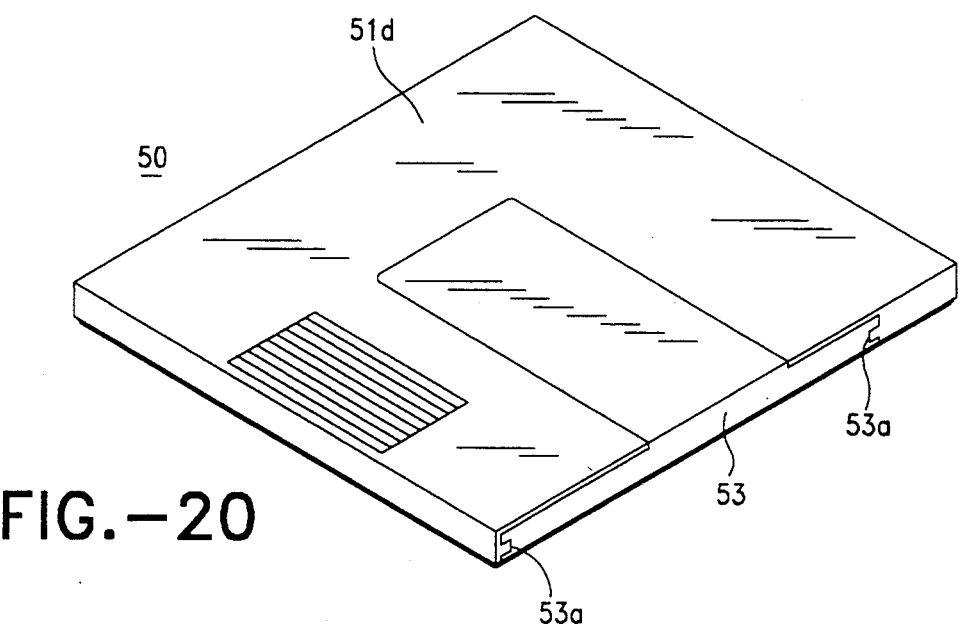
FIG. 20 is a view similar to FIG. 19, but in which the shutter is closed.
Figure 23:
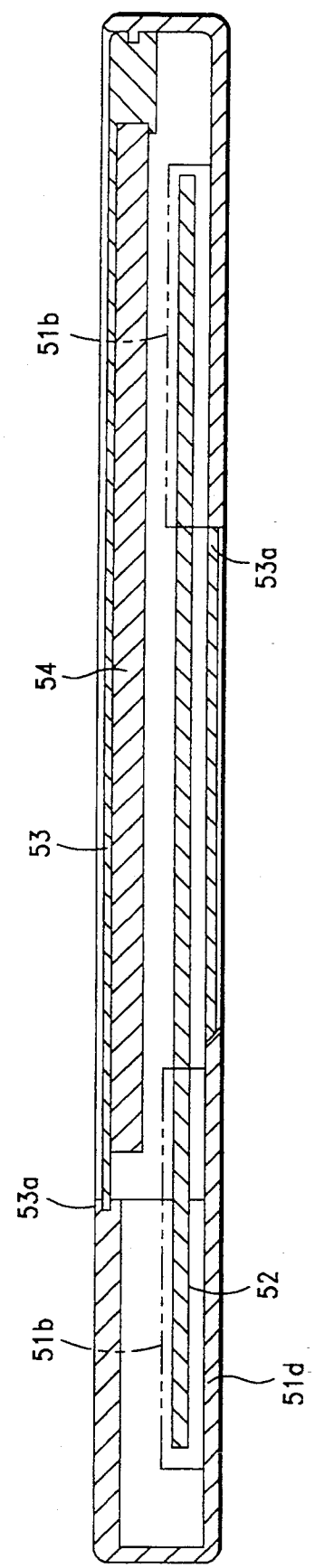
FIG. 23 is a vertical cross section of the disk cartridge shown in FIG. 19.

FIG. 19 is a perspective view of a disk cartridge containing an optical storage disk such as a read-only disk with the shutter of the cartridge being open. FIG. 20 shows a similar view with the shutter being closed after the use of the cartridge. FIG. 21 is a vertical cross section of the disk cartridge. FIG. 22 is a plan view of the cartridge. FIG. 23 is a vertical cross section of the cartridge.

In these figures, an information storage medium, such as disk cartridge 50, includes a first resinous case 51d containing a read-only optical storage disk 52, or a first disk. First case 51d is composed of a front casing and a rear casing. Optical storage disk 52 is inserted in the space between these two casings. This disk cartridge 50 has a shutter 53 for opening and closing an opening 51a in first case 51d. This shutter 53 is provided with two grooves 53a alongside first case 51d. The grooves act to guide first case 51d. First case 51d has rails 51e engaged in grooves 53a. As shown in FIGS. 21 and 23, a second case 54 receiving a magnetic storage disk 55 comprising a 3.5 inch-floppy disk is nested in shutter 53. When shutter 53 is moved to open or close opening 51a, second case 54 moves in the same direction. Second case 54 is provided with openings 54a to permit the magnetic head to access magnetic storage disk 55. Openings 54a are usually closed by a shutter (not shown) mounted on case 54. The shutter is made to engage a part of first case 51d so that openings 54a are opened and closed in synchronism with the operation of shutter 53 for opening case 51d. Thus, when shutter 53 shown in FIGS. 19 and 22 operates to open first case 51d, the shutter (not shown) on second case 54 opens openings 54a in second case 54. Openings 54a in case 54 are located outside first case 51d by the movement of shutter 53. As shown in FIG. 19, opening 51a is formed in the front surface of case 51d. After the movement of shutter 53, central hole 52a in optical storage disk 52 is exposed through this opening 51a. As shown in FIG. 22, a vertically extending opening is formed on the rear side of case 51d by the movement of shutter 53.

In this way, optical storage disk 52 contained in first case 51d is exposed through both openings formed on the front side and the rear side, respectively, of first case 51d. Therefore, optical storage disk 52 is clamped to its both sides vertically on a turntable driven by a spindle motor of a well-known CD player, CD drive, or the like. Thus, disk 52 can be rotated. The optical head can access the disk via the vertically extending opening on the rear side.

On the other hand, second case 54 for magnetic storage disk 55 is housed in shutter 53. Shutter 53 is provided with a cutout opposite to opening 54a. Shutter 53 is further formed with a cutout opposite to a clamping portion, or clamping means 55b of magnetic storage disk 55 enclosed in case 54. Thus, when shutter 53 moves into either the position shown in FIG. 19 or the position indicated by the imaginary line in FIG. 22, the shutter (not shown) on second case 54 containing disk 55 is opened as mentioned above. In consequence, magnetic storage disk 55 is also exposed through openings 54a and through the cutouts in shutter 53. As a result, disk 55 is loaded such that disk 55 and clamping means 55b, or the central hole, are exposed at given positions. Simultaneously with the loading, clamping means 55b of disk 55 is clamped to the turntable (not shown) through the cutout. Disk 55 is fully exposed through the cutouts and openings 54a on both sides. Under this condition, the disk drive can read and write information to and from disk 55.

When disk cartridge 50 described above is not loaded into the disk drive, the cartridge hardly differs in appearance from a conventional disk cartridge containing a single disk, as shown in FIG. 22. However, when disk cartridge 50 is loaded into the disk player or the disk drive, the shutter-driving means of the player or the drive opens up shutter 53 to the position shown in FIG. 19. Then, cartridge 50 approaches the spindle motors in a known manner, and optical storage disk 52 and magnetic storage disk 55 are clamped to their respective spindle motors of the player or the drive.

It is necessary that first case 51d and second case 54 be accurately placed in position in the player or drive. Variations in the components of the player or drive and in various portions of first case 51d and second case 54 affect the control over the positions and thus the accuracy of the positioning. Accordingly, in this embodiment, to avoid these problems, a positioning stabilization mechanism is used. In particular, when first case 51d and second case 54 are in the positions shown in FIG. 20, the dimensional tolerances between rails 51e on first case 51d and guide grooves 53a in shutter 53 are very strict. When shutter 53 moves and takes the position shown in FIG. 19 so as to open the openings, the dimensional tolerances between rails 51e and guide grooves 53a in shutter 53 are increased both vertically (in the direction of the thickness of the case) and horizontally (perpendicularly to the direction in which shutter 53 moves). Therefore, shutter 53 and second case 54 can move only small distances vertically and horizontally relative to first case 51d. The distance in the direction in which shutter 53 moves can be adjusted by adjusting the stroke of the shutter. Guide holes 51c formed in the first case allows first case 51d to be placed in its optimum position relative to the player for optical storage disk 52. Guide holes 54c formed in second case 54 allows this case to be placed in its optimum position relative to the drive for magnetic storage disk 55. During these positioning operations, if the positioning mechanisms for the cases produce slight deviations due to variations of the components, these deviations are absorbed by the dimensional tolerances. Optical storage disk 52 and magnetic storage disk 55 are clamped to their respective spindle motors of the player or the drive. Appropriate gaps are secured between optical storage disk 52 and the cartridge and between magnetic storage disk 55 and the cartridge. Consequently, disks 52 and 55 can rotate without interfering with each other. Information can be written and read to and from these disks in accordance with the instructions from the player or drive. These writing and reading are performed separately for each disk or in cooperation.

As described thus far, in this information storage medium 50, optical storage disk 52 and magnetic storage disk 55 are loaded in the cartridge. Thus, after information is retrieved from optical storage disk 52 and calculations are performed by a CPU in a personal computer, game machine, or the like, the results of the processing can be recorded in magnetic storage disk 55 if necessary. For example, these data can be combined with the data input to the personal computer or game machine from the outside. If the operation of a game machine is interrupted, information about the interrupted condition is temporarily stored in magnetic storage disk 55. When the operation is resumed, the information is read out, and the game can be resumed from the interrupted condition. As shown in FIG. 22, disk cartridge 50 is provided with opening 51a extending horizontally in the front surface. The cartridge is also provided with an opening 54a in its rear surface, opening 54a extending perpendicularly to opening 51a. In this way, these two openings 51a and 54a extend in different directions. Therefore, the disk drive for use with this disk cartridge 50, or information storage medium, is required to have both an optical reader mechanism and a magnetic drive mechanism. Since the openings permitting their respective heads to access the respective disks extend in different directions, relatively large tolerances are permitted on the planes on which the head of the optical reader mechanism and the head of the magnetic drive mechanism are mounted, respectively. Hence, the internal structure of the disk drive is simplified.

In this embodiment, second case 54 containing magnetic storage disk 55 is received in disk cartridge 50, together with optical storage disk 52. However, the invention is not limited to this structure. For instance, the following structure can also be used. As shown in FIG. 22, the inside of shutter 53 has a box shape. Magnetic storage disk 55 from which second case 54 is removed is placed inside the box shaped space in the shutter with small dimensional tolerances. When the shutter is opened or closed, magnetic storage disk 55 is moved out of this position as shutter 53 moves. The result is that the head and the spindle motor of a floppy disk drive or the like can be placed without interfering with first case 51d or with the head or the spindle motor for the optical storage disk.

The width of shutter 53 can be extended to the full width of first case 51d shown in FIG. 22. Shutter 53 is moved beyond the position indicated by imaginary line in FIG. 22 in opening up the opening. In this way, shutter 53 can be removed from case 51d. If shutter 53 is removed together with second case 54 from case 51d, a hole appears on one side surface of first case 51d. Optical storage disk 52 is slid through this side hole and removed. Then, an optical storage disk storing other information is loaded. Thereafter, reverse operations are performed. In other words, shutter 53 is again mounted to first case 51d and used. Then, processing can be performed with a combination of different disks. In this case, shutter 53 is not detached from first case 51d but moved an appropriate distance to permit replacement of optical storage disk 52. The replaced disk is not limited to optical storage disk 52. Magnetic storage disk 55 can be a replaceable one.

Embodiment 10

The disk drive which can be used with the information storage medium or the disk cartridge comprising the optical storage disk and the magnetic storage disk described above is described below.

Figure 24:
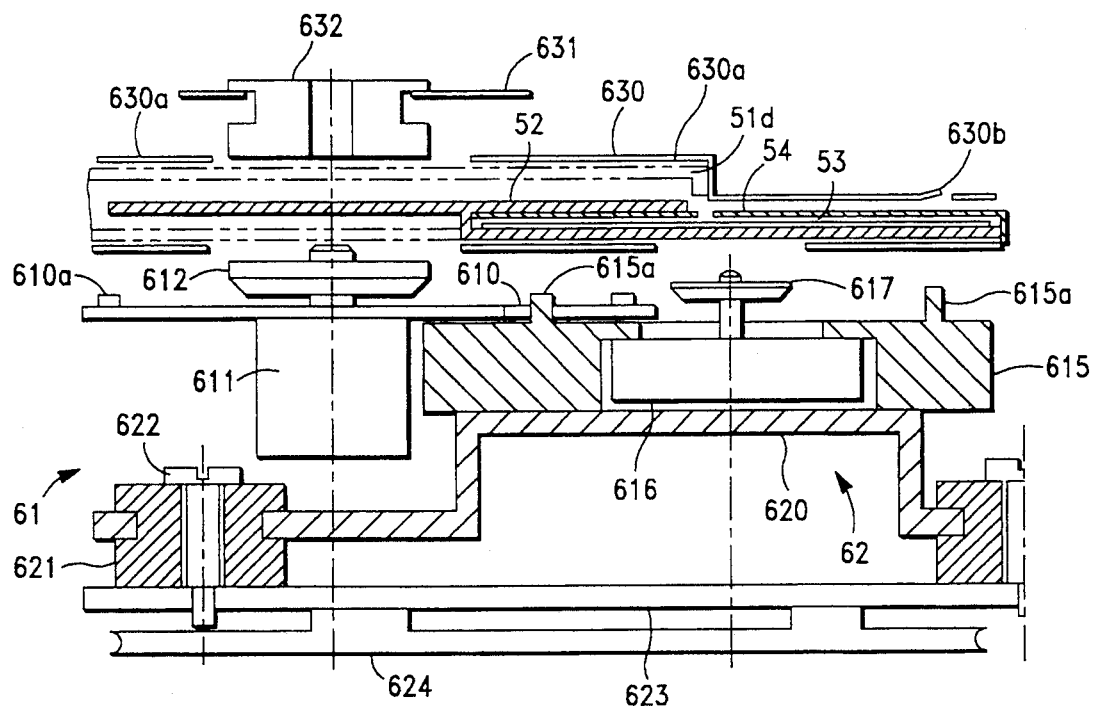
FIG. 24 is a fragmentary side elevation in cross section of a drive unit according to Embodiment 10 of the invention.

FIG. 24 is a side elevation in cross section of the disk drive. This figure shows the condition in which the disk cartridge has been inserted in the disk drive before the disks in the first and second cases in the disk cartridge are clamped to the spindle motors.

Figure 25:
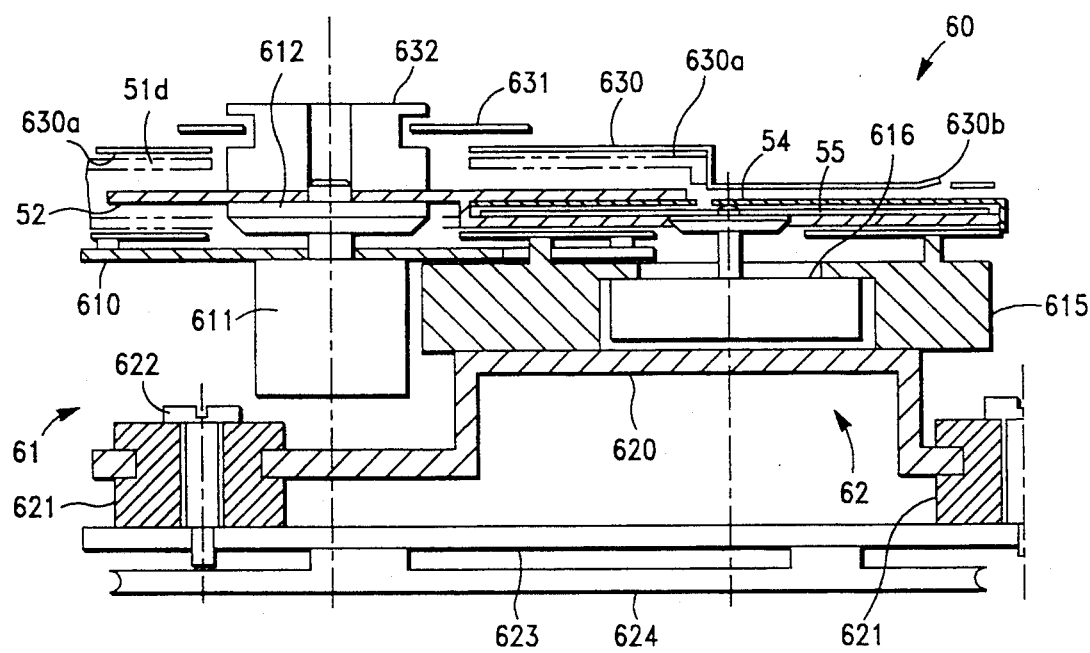
FIG. 25 is a view similar to FIG. 24, but in which the disk cartridge has been lowered, and an optical storage disk and a magnetic storage disk contained in the cartridge are clamped to their respective spindle motors.
Figure 26:
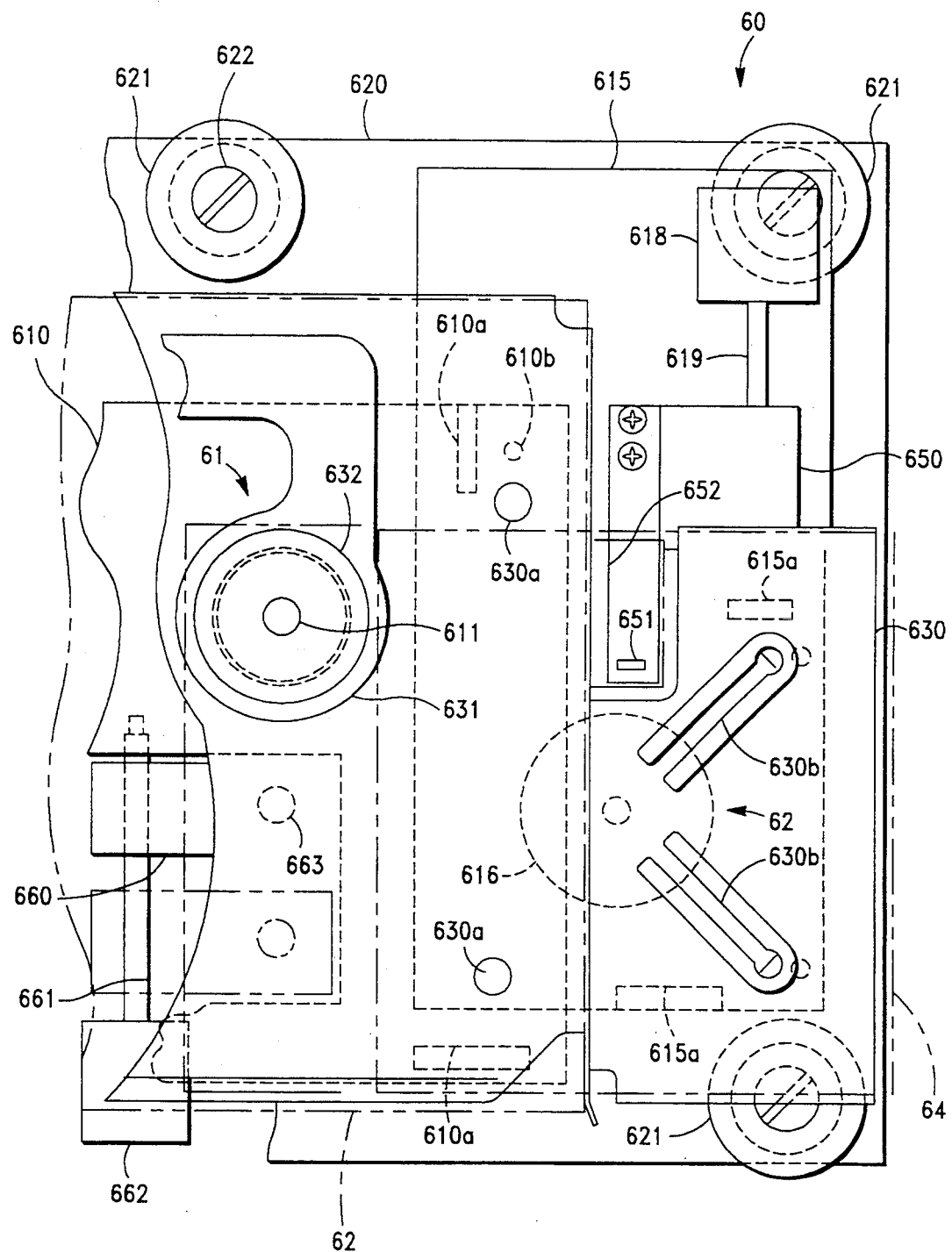
FIG. 26 is a fragmentary plan view of the drive unit shown in FIG. 24.
Figure 27:
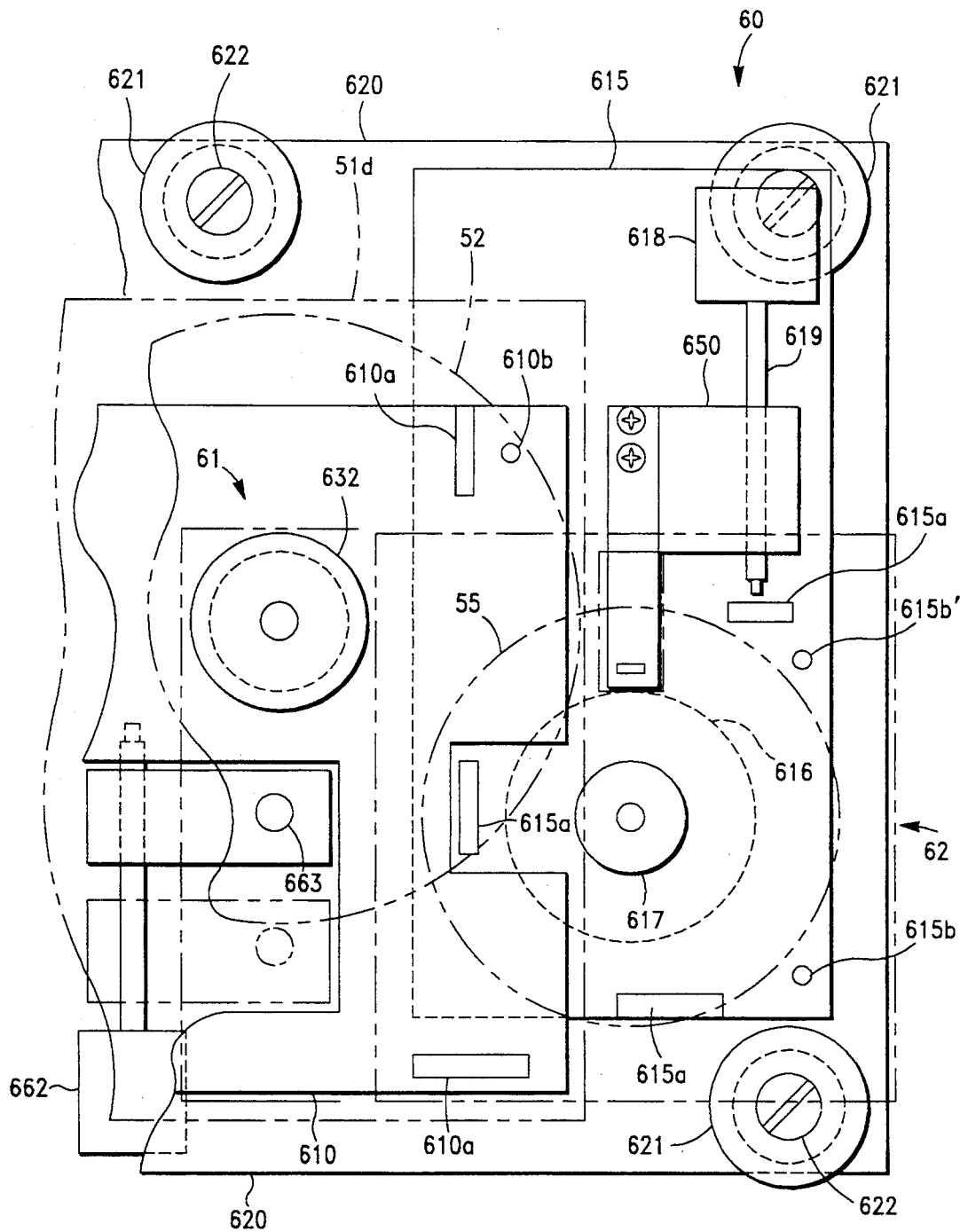
FIG. 27 is a view similar to FIG. 26, but in which a holder has been removed.
Figure 28:
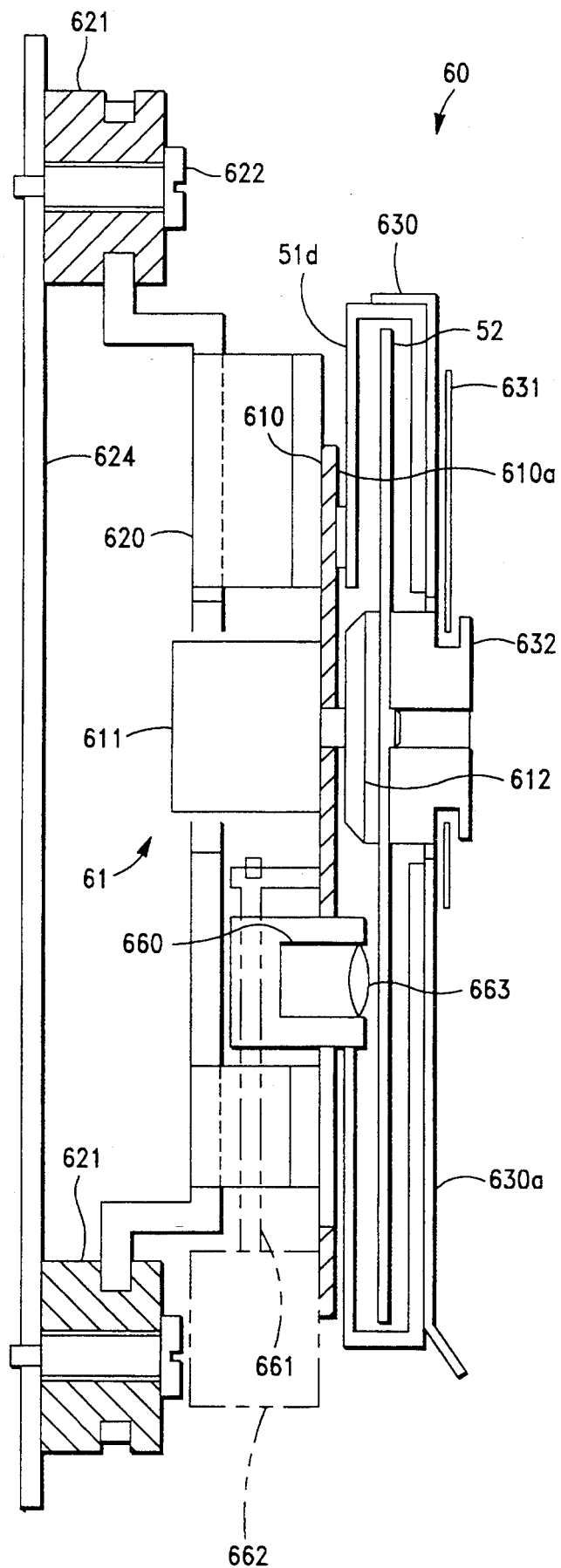
FIG. 28 is a side elevation in cross section of a CD unit of the drive unit shown in FIG. 24, taken substantially along a vertical line passing through the center of the spindle motor of the optical reader mechanism.
Figure 29:
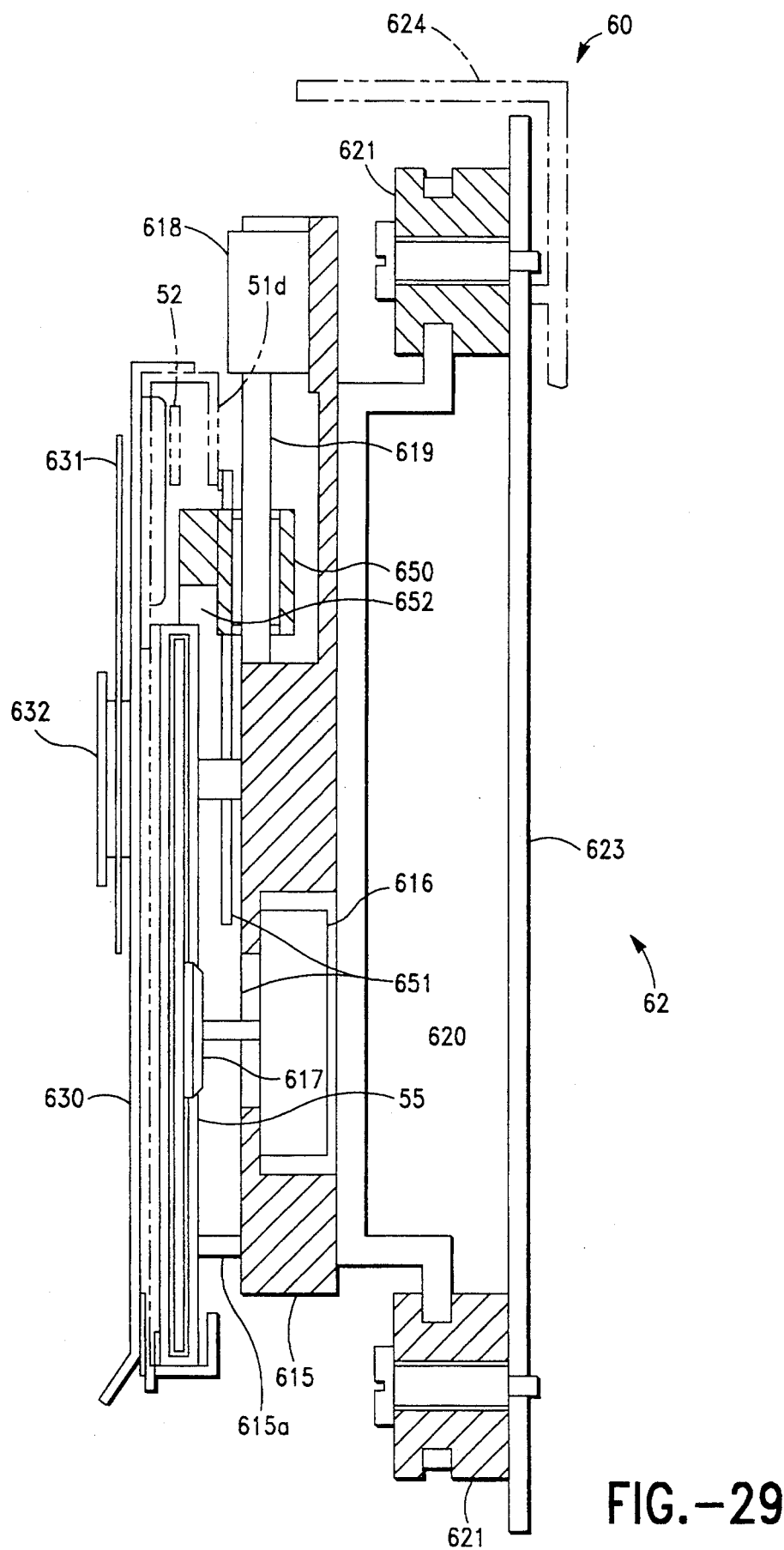
FIG. 29 is a fragmentary side elevation in cross section of the drive unit shown in FIG. 24, taken substantially along a vertical line passing through the center of the spindle motor of the magnetic drive mechanism.

FIG. 25 is a side elevation in cross section of the disk drive. This figure shows the condition in which the disk cartridge has been lowered from the position shown in FIG. 24. It also shows that the optical storage disk and the magnetic storage disk contained in the cartridge have been clamped to the spindle motors. FIG. 26 is a fragmentary plan view of the disk drive as viewed from above the drive. FIG. 27 is a view similar to FIG. 26, but the holder has been removed. FIG. 28 is a side elevation in cross section of a CD unit, taken along a substantially vertical line passing through the center of the spindle motor of the optical reader mechanism. FIG. 28 also shows that the optical storage disk has been clamped to the spindle motor. FIG. 29 is a side elevation in cross section of the disk drive shown in FIG. 26, taken along a substantially vertical line passing through the center of the spindle motor of the magnetic drive mechanism. FIG. 30 shows the condition in which the first case or the second case forming the disk cartridge has been fully loaded in the corresponding unit after being guided by guide pins on the first or second chassis. FIG. 31 is a perspective view of the disk drive, showing the condition in which the disk cartridge is loaded into the disk drive.

In these figures, information storage medium 60 represents disk cartridge 50 of Embodiment 9. Of the two kinds of disks contained in cartridge 50, optical storage disk 52, or the first disk, which is a read-only optical storage disk or CD is contained in first case 51d, while a magnetically accessible disk, i.e., magnetic storage disk 55, or the second disk, is received in second case 54, which is movably or detachably mounted to first case 51d. Magnetic storage disk 55 functions similarly as a conventional floppy disk. Second case 54 is detachably attached to shutter 53, which is mounted on the two sides of first case 51d.

Disk drive 60 for use with the disk cartridge 50 has a first chassis 610. When first case 51d and second case 54 are together inserted as disk cartridge 50 into disk drive 60, guide pins 610b of first chassis 610 can guide first case 51d. Also, mounted on first chassis 610 are a spindle motor 611 for clamping and rotating optical storage disk 52, an optical head 660 including an objective lens 663, a seek motor 662 for linearly reciprocating optical head 660 radially of optical storage disk 52, and a feed screw 661 connected to the output shaft of motor 662. Optical head 660 is connected to a screw mechanism via feed screw 661. Furthermore, first chassis 610 has guide protrusions 610a for placing first case 51d in position relative to first chassis 610 in the direction of the height when optical storage disk 52 in first case 51d is mounted on a turntable 612 driven by spindle motor 611. These first chassis 610, optical head 660, spindle motor 611, and their ancillary elements together form a CD unit 61, or an optical reader unit.

A spindle motor 616 and a magnetic head 651 for magnetically writing and reading information to and from magnetic storage disk 55 are mounted on a second chassis 615. This head 651 is mounted to a carriage 650 via a head spring 652 and can perform a seek operation radially of magnetic storage disk 55. A feed screw 619 connected to the output shaft of a seek motor 618 is connected to carriage 650, motor 618 acting as a power source for the seek operation. As shown in FIGS. 29 and 30, second chassis 615 has positioning protrusions 615a and guide pins 615b. When magnetic storage disk 55 is installed on turntable 617 driven by spindle motor 616, positioning protrusions 615a place second case 54 in position relative to turntable 617 in the direction of the height. Guide pins 615b place second case 54 in position relative to the turntable along the plane of case 54. These second chassis 615, spindle motor 616, magnetic head 651, seek motor 618, and their ancillary parts together form a floppy disk unit 62, or a magnetic drive unit. Openings 51a and 54a in disk cartridge 50 for accessing by the heads extend in different directions. Thus, in disk drive 60, optical head 660 of CD unit 61 and magnetic head 651 of floppy disk unit 62 are spaced apart from each other as shown in FIG. 26.

In above disk drive 60, disk cartridge 50 contains optical storage disk 52, which is a read-only optical storage disk, and magnetic storage disk 55 for magnetically writing and reading information. When cartridge 50 is inserted into a holder 630 of a main chassis 620 of disk drive 60 from the front end shown in FIG. 20 and from the lower side as viewed in FIG. 26, holder 630 is spaced away from floppy disk unit 61 and from floppy disk unit 62 in the direction of height. First case 51d is inserted without interfering with either the top of spindle motor 611 of CD unit 61 or the top of spindle motor 616 of floppy disk unit 62. In the final stage of this insertion operation, a lever 660 for moving shutter 53 engages a hole in the rear surface of shutter 53, so that power is transmitted to all of a cartridge-pulling motor 665, a pinion 664 mounted to motor 665, and a gear 663 rigidly mounted to lever 660. Lever 660 is rotated to the right about a pin 661 relative to holder 630. This rotation pulls second case 54 out of first case 51d together with shutter 53, as shown in FIGS. 19 and 31. Second case 54 is installed inside shutter 53 of first case 51d and contains magnetic storage disk 55. These operations are performed inside holder 630. The pulled condition is shown in FIGS. 19 and 31.

When the pulling operation is completed, the opening in the rear surface for turntable 612 driven by spindle motor 611 is located opposite to turntable 612 or optical head 660. The opening is closed by shutter 53. As shown in FIGS. 19 and 31, the upper side of first case 51d is opened by movement of shutter 53. Opening 51a forms a space receiving a clamping member 632 which magnetically attracts turntable 612 and clamps optical storage disk 52.

On the other hand, during the pulling operation, shutter 53 forming second case 54 is moved, so that opening 54a (FIGS. 19 and 22) in second case 54 is exposed from first case 51d. Shutter 53 and the rear surface of second case 54 are provided with openings aligning with opening 54a. Under this condition, both front and rear surfaces of magnetic storage disk 55 are exposed from second case 54. An opening for receiving turntable 617 driven by spindle 616 of floppy disk unit 62 is exposed at the rear surface of second case 54. This opening is opposite to all of magnetic head 651, head spring 652, and turntable 617.

Under this condition, holder 630 is moved downward into the position shown in FIG. 25. During this operation, optical storage disk 52 is placed in position within the plane of spindle motor 611 in the direction of height. Further downward movement of the holder lowers lever 631, and the disk is clamped by clamping member 632. At the same time, as shown in FIG. 30, guide holes 51c in first case 51d come into engagement with two positioning pins 610b fixedly mounted to first chassis 610 of CD unit 61. As a result, first case 51d is held on one plane to CD unit 61. As shown in FIGS. 24–28, first case 51d is guided by guide protrusions 610a formed on first chassis 610 and held horizontal. An adequate gap is secured between first case 51d and optical storage disk 52. Disk 52 is positioned inside first case 51d without interfering with the inner surface of first case 51d both along the plane and in the direction of height. Optical storage disk 52 is then rotated by spindle motor 611 via turntable 612.

The downward movement of holder 630 moves second case 54 downward toward floppy disk unit 62. This forces turntable 617 into the opening in the rear surface of second case 54, as shown in FIGS. 25 and 29. Turntable 617 is magnetically attracted to the rear surface of magnetic storage disk 55 and engages it, thus determining the relative height of disk 55. As second case 54 moves downward, magnetic head 651 and head spring 652 mounted to the head operate from their opened conditions. As shown in FIGS. 26 and 29, they come into contact with disk 55 from its both sides, whereby disk 55 is sandwiched between them.

Under this condition, spindle motors 611 and 616 turn to thereby rotate turntables 612 and 617, thus rotating optical storage disk 52 on turntable 612 and magnetic storage disk 55 on turntable 617. Optical head 660 of CD unit 61 and magnetic head 651 of floppy disk unit 62 act on optical storage disk 52 and magnetic storage disk 55, respectively. The optical head reads information from optical storage disk 52. Then, processing of a game or the like is made to progress according to the information. As the processing progresses, relevant information is magnetically recorded in magnetic storage disk 55 if necessary. When it is necessary to interrupt a game, the user can restart it from the interrupted condition, provided that conditions necessary for restart of the game are previously written to disk 55 based on instructions from a control circuit.

In this embodiment, CD unit 61 and floppy disk unit 62 are mounted adjacent to each other on main chassis 620. Shock-absorbing means 621, for example, comprising rubber are disposed at plural locations on main chassis 620. These shock-absorbing means 621 are rigidly mounted to a rear plate 623 of a case by screws 622. Rear plate 623 is connected to a case 624 for disk drive 60.

As described thus far, in disk drive 60, a CD having a larger storage capacity than a semiconductor ROM can be utilized without combining a semiconductor ROM and semiconductor RAM. Also, a magnetic disk having a larger storage capacity than a semiconductor ROM can be employed. Hence, the cost per unit storage capacity is reduced. Although there are two disks, they are enclosed in single disk cartridge 50, which can be used as an information storage medium. Therefore, it is easy for the user to handle it. Furthermore, a mechanism for automatically pulling second case 54 from first case 51d is provided. Thus, it is not necessary for the user to manually perform the pulling operation, and the disk drive can be conveniently used.

Since main chassis 620 includes shock-absorbing means 621, external vibrations and shock are less likely to be transmitted to the chassis than in the case where each one of the CD unit and floppy disk unit is installed separately. Furthermore, only one set of shock-absorbing means is provided and thus the number of the locations at which shock-absorbing means 621 are mounted can be reduced. Especially, where only one set of shock-absorbing means 621 is provided, each unit swings in the same direction as the loading mechanism and by the same amount. Therefore, neither optical storage disk 52 nor magnetic storage disk 55 is unclamped. Also, the components are prevented from being damaged. Consequently, disk drive 60 can be simplified in structure.

The mechanism for clamping spindle motor 611 to optical storage disk 52 can perform a clamping operation more reliably by using the following structure.

Figure 32:
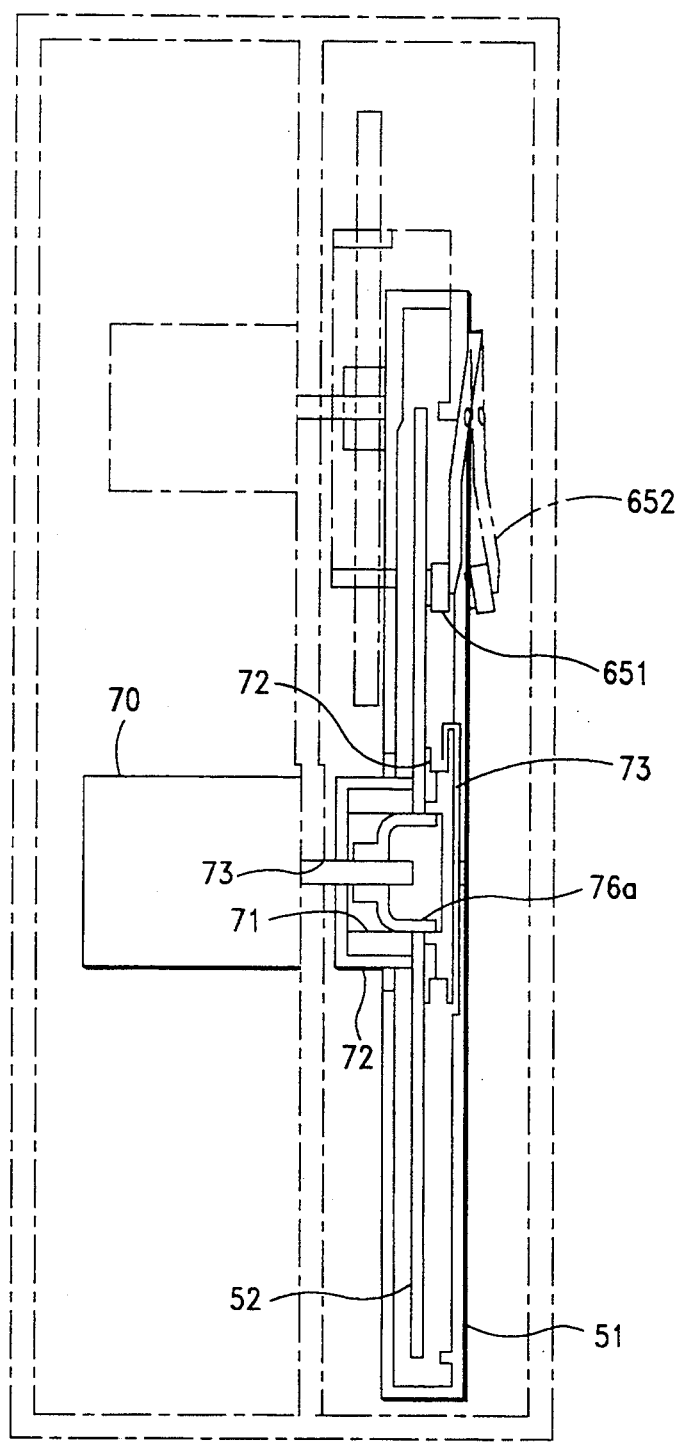
FIG. 32 is a cross-sectional view of an improved clamping mechanism of the drive unit shown in FIG. 24, for showing surroundings of spindle motors.
Figure 33:
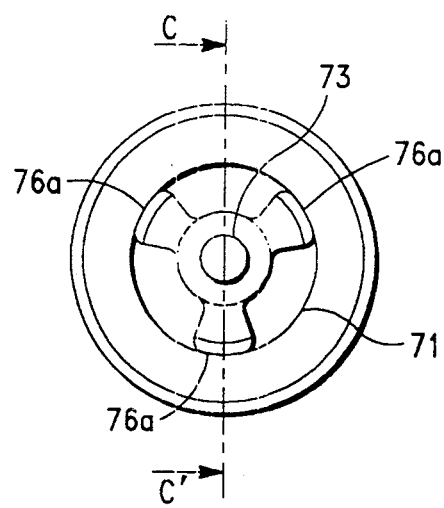
FIG. 33 is a plan view of the spindle motor and its surroundings of the clamping mechanism shown in FIG. 32.
Figure 34:
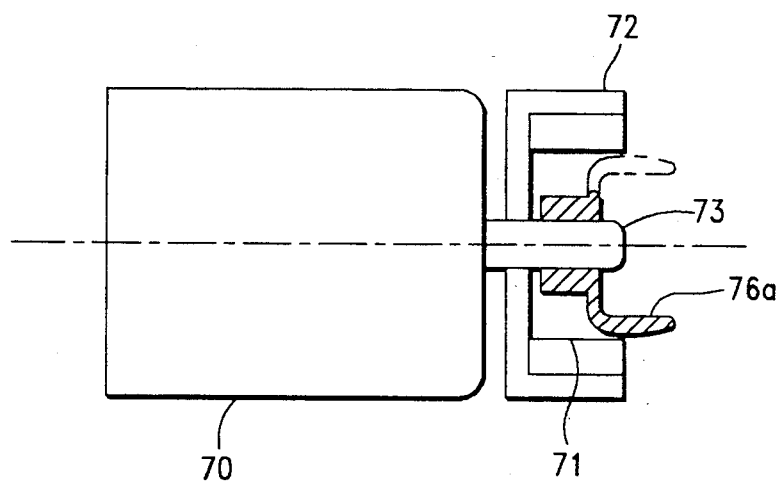
FIG. 34 is a cross-sectional view taken along line C-C' of FIG. 33.

FIG. 32 is a cross-sectional view of the spindle motor of the disk drive, including the surroundings of the spindle motor. FIG. 33 is a plan view of the spindle motor. FIG. 34 is a cross-sectional view taken along line C-C' of FIG. 33.

In these figures, three claws 76a are disposed coaxially with spindle 73 of spindle motor 70 at the front end of spindle 73 and resiliently engage the central hole in optical storage disk 52. Therefore, when optical storage disk 52 is exposed from cartridge 51, disk 52 moves downward, and its central hole comes into engagement with claws 76a. Since the diameter of the circle circumscribing claws 76a is set somewhat larger than the inside diameter of the central hole in optical storage disk 52, automatic engagement is not attained under this condition. However, when disk 52 moves a given distance downwardly, a guide plate or clamping member 73 moves downward from above disk 52, urging disk 52 downward. Therefore, all claws 76a bend inwardly to the same extent. The result is that claws 76a engage the central hole in optical storage disk 52 without play. A board 72 mounted inside disk cartridge 51 is attracted to a permanent magnet 71 fixedly mounted inside turntable 72 driven by spindle 73. This assures that optical storage disk 52 is held at the front end of spindle 73 and can be rotated with turntable 72 while maintained in engagement with claws 76a. In the foregoing description, the connecting means is located on the side of the spindle motor. This connecting means may also be mounted in the central hole in the information storage medium. In FIG. 32, magnetic head is indicated by 651. Head spring 652 connects together head 65 1 and carriage 650. Therefore, reading with the optical head and writing and reading with the magnetic head can be accomplished with high reliability.

The various components of the information storage media and the disk drives of Embodiments 1–10 described above can be combined. Where two rotation driving systems are needed for optical reading and for magnetic reading, respectively, for rotation relative to an information storage medium as in the disk drive of Embodiment 10, one spindle motor can be used for the two driving systems.

As described thus far, in the present invention, a read-only optical storage portion and a magnetic storage portion permitting both writing and reading are both formed on one information storage medium. In consequence, an information storage medium having both an optical storage portion of a large storage capacity and a magnetic storage portion capable of both writing and reading can be accomplished.

Where the magnetic storage portion is formed on the surface of an optical storage disk, a rewritable information storage medium having a large storage capacity can be realized by a single disk. Furthermore, this medium is compatible with the conventional optical storage disk. Where a region in which certain data indicating that the magnetic storage portion exists is formed in the optical storage portion, no problems occur if this medium is treated in the same way as the conventional optical storage media because it is possible to detect the presence of the magnetic storage portion. In manufacturing this information storage medium, if the magnetic storage portion is formed by using an optical storage disk as a base with a bonding tape or the like containing a magnetic material applied to the base, the steps for manufacturing conventional optical storage disks can be utilized directly. In addition, the medium can be fabricated easily without affecting the functions of the optical storage disk.

Where the information storage medium has an outer case enclosing the body of the medium on which the magnetic and optical storage portions are formed, the outer case is provided with openings permitting the heads to have access to the magnetic and optical storage portions. If these openings are spaced away from each other circumferentially of the body of the medium, the effect of magnetic flux leaking from the optical head is minimized on the magnetic head. Consequently, highly reliable operation can be performed.

This information storage medium writes and reads information to and from the magnetic storage portion of the medium while the rotation of the medium is controlled in accordance with the optical information read from the medium. Therefore, the present invention can be used in cases where optically stored information is read by the CLV method, the CAV method, or a more complex method. To increase the storage capacity of the magnetic storage portion, it is possible to move the optical head across every track of the magnetic storage portion which has an optical storage portion of the CLV system as well as plural tracks. The storage capacity is varied from track to track.

Where an information storage medium in the form of a cartridge incorporating a first disk forming an optical storage portion and a second disk forming a magnetic storage portion is constructed, the information storage medium and a drive unit can be operated on by using the conventional writing and reading techniques directly. This is economically advantageous. Furthermore, compatibility with the prior art cartridge-type information storage medium can be easily achieved. Where the openings formed in the cartridge for permitting the heads to gain access to the magnetic storage disk and the optical storage disk are made to extend in different directions, there are less strict restrictions on the arrangement of the magnetic head and the optical head. Consequently, the drive unit can be designed with higher degree of freedom.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

I claim:

1. A drive unit, comprising:
    an information storage medium including;
        a read-only optical storage portion, and
        a magnetic storage portion attached to one surface of said optical storage portion and capable of being magnetically written thereon and read therefrom,
            wherein said optical storage portion includes means for indicating the presence of said magnetic storage portion on said optical storage portion;
    disk-rotating means for mounting and rotating the medium;
    magnetic drive means including a magnetic head for writing and reading information to and from said magnetic portion of the medium;
    optical information reading control means including an optical head for controlling a rotational speed of said disk-rotating means according to information read from said optical storage portion by said optical head, so that during an optical reading as the optical head moves away from the center of the medium, the medium is rotated at a slower speed and as the optical head approaches the center of the medium, the medium is rotated at a higher speed, such that information is read out from said optical storage portion at a constant linear rate;
    optical head drive means for driving said optical head, and
    system controller means for controlling the operations of said magnetic drive means and said optical head drive means;
    wherein during a magnetic reading or writing
    said system controller means causes said optical head drive means to move said optical head to a given position to read optical information from said optical storage portion;
    based on the optical information read by said optical heat, said optical information reading control mean causes the disk-rotating means to maintain the rotational speed of the medium at a constant speed;
    after the rotational speed of the medium is maintained at a constant speed, said system controller means causes said magnetic drive means to move said magnetic head to a position to allow information to be magnetically read from or written into said magnetic storage portion.

2. The drive unit of claim 1, wherein the medium further includes a second magnetic storage portion attached to a second surface of said optical storage portion.

3. The drive unit of claim 1, wherein said indicating means of said optical storage portion of the medium includes a region for storing identification data indicating that said magnetic storage portion is present.

4. The drive unit of claim 1, wherein said magnetic storage portion of the medium is formed opposite to a surface of said optical storage portion on which light for reading said optical storage portion impinges.

5. The drive unit of claim 4, wherein the medium further includes an outer case enclosing said magnetic storage portion and said optical storage portion, said outer case including two openings for permitting said magnetic head and said optical head of a disk drive to have access to said magnetic storage portion and said optical storage portion, respectively, and wherein said two openings are spaced from each other circumferentially of the medium at a predetermined angle so as to prevent mutual interference between the magnetic and optical heads.

6. The drive unit of claim 1, further comprising a cover and support means for raising the magnetic head while interlocking with the cover, so that when the cover opens up for loading the medium, said support means and said cover move together, along with the magnetic head.

7. The drive unit of claim 1, further comprising a securing member, wherein the magnetic head has a fixed point mounted to said securing member, and wherein said optical head drive means further includes means, fixedly mounted to said securing member, for moving the optical head.

8. The drive unit of claim 1, wherein the magnetic head and the optical head are disposed on opposite sides of the information storage medium loaded in the drive unit, and wherein said magnetic drive means further includes means for keeping the magnetic head apart from the medium when the magnetic head does not access said magnetic storage portion and for bringing the magnetic head into contact with the medium when the magnetic head accesses said magnetic storage portion.

9. The drive unit of claim 8, wherein further comprising connecting means, mounted on the disk-rotating means, for flexibly securing said medium on the disk-rotating means.

10. The drive unit of claim 9, wherein said connecting means includes means for securing said medium in position on a plane parallel with a plane of the medium and means for securing said medium in position in a direction parallel to the thickness direction of the medium.

11. The drive unit of claim 1,
wherein said optical head drive means further includes decision means, responsive to the indicating means of said optical storage portion, for determining whether the information storage medium loaded in the drive unit has said magnetic storage portion attached to said optical storage portion; and
wherein said system controller means prevents the magnetic head from making contact with the medium if said determining means determines that the medium does not have said magnetic storage portion.

12. The drive unit of claim 11, wherein said decision means determines whether the loaded information storage medium has said magnetic storage portion, based on information read from a region in the indicating means of said optical storage portion, said region being used for storing identification data indicating the presence of said magnetic storage portion.

13. The drive unit of claim 11, wherein said decision means determines whether the loaded information storage medium has said magnetic storage portion by detecting the presence of a portion having a predetermined shape in a case accommodating said information storage medium.

14. The drive unit of claim 1, wherein the magnetic head and the optical head are spaced apart from each other circumferentially of said information storage medium at a predetermined angle so as to prevent mutual interference between the magnetic and optical heads.

15. A drive unit for writing and reading information to and from an information storage medium that comprises a read-only optical storage portion and a magnetic storage portion which is attached to one surface of said optical storage portion, said optical storage portion including means for indicating the presence of said magnetic storage portion on said optical storage portion, said drive unit comprising:
disk-rotating means for mounting and rotating the medium;
magnetic drive means including a magnetic head for writing and reading information to and from said magnetic portion of the medium;
optical information reading control means including an optical head for controlling a rotational speed of said disk-rotating means according to information read from said optical storage portion by said optical head, so that during an optical reading as the optical head moves away from the center of the medium, the medium is rotated at a slower speed and as the optical head approaches the center of the medium, the medium is rotated at a higher speed, such that information is read out from said optical storage portion at a constant linear rate;
optical head drive means for driving said optical head; and
system controller means for controlling the operations of said magnetic drive means and said optical head drive means;
wherein during a magnetic reading or writing
said system controller means causes said optical head drive means to move said optical head to a given position to read optical information from said optical storage portion;
based on the optical information read by said optical head, said optical information reading control means causes the disk-rotating means to maintain the rotational speed of the medium at a constant speed;
after the rotational speed of the medium is maintained at a constant speed, said system controller means causes said magnetic drive means to move said magnetic head to a position to allow information to be magnetically read from or written into said magnetic storage portion;
wherein the magnetic head and the optical head are spaced apart from each other circumferentially of said information storage medium at a predetermined angle so as to prevent mutual interference between the magnetic and optical heads.

16. The drive unit of claim 15 wherein the medium further includes a second magnetic storage portion attached to a second surface of said optical storage portion.

17. The drive unit of claim 15 wherein said indicating means of said optical storage portion of the medium further includes a region for storing identification data indicating that said magnetic storage portion is present.

18. The drive unit of claim 15 wherein said magnetic storage portion of the medium is formed opposite to a surface of said optical storage portion on which light for reading said optical storage portion impinges.

19. The drive unit of claim 18 wherein the medium includes an outer case enclosing said magnetic storage portion and said optical storage portion, said outer case including two openings for permitting a magnetic head and an optical head of a disk drive to have access to said magnetic storage portion and said optical storage portion, respectively, and wherein said two openings are spaced from each other circumferentially of the medium at a predetermined angle so as to prevent mutual interference between the magnetic and optical heads.

20. The drive unit of claim 15,
wherein said optical head drive means further includes decision means, responsive to the indicating means of said optical storage portion, for determining whether the information storage medium loaded in the drive unit has said magnetic storage portion attached to said optical storage portion; and wherein said system controller means prevents the magnetic head from making contact with the medium if said determining means determines that the medium does not have said magnetic storage portion.

21. The drive unit of claim 20; wherein said decision means determines whether the loaded information storage medium has said magnetic storage portion, based on information read from a region in the indicating means of said optical storage portion, said region being used for storing identification data indicating the presence of said magnetic storage portion.

22. The drive unit of claim 20, wherein said decision means determines whether the loaded information storage medium has said magnetic storage portion by detecting the presence of a portion having a predetermined shape in a case accommodating said information storage medium.

23. The drive unit of claim 15, further comprising a cover and support means for raising the magnetic head while interlocking with the cover, so that when the cover opens up for loading the medium, said support means and said cover move together, along with the magnetic head.

24. The drive unit of claim 15, further comprising a securing member, wherein the magnetic head has a fixed point mounted to said securing member, and wherein said optical head drive means further includes means, fixedly mounted to said securing member, for moving the optical head.

25. The drive unit of claim 15, further comprising connecting means, mounted on the disk-rotating means, for flexibly securing said medium on the disk-rotating means.

26. The drive unit of claim 25, wherein said connecting means includes means for securing said medium in position on a plane parallel with a plane of the medium and means for securing said medium in position in a direction parallel to the thickness direction of the medium.

* * * * *